United States Patent
Chien et al.

(10) Patent No.: US 9,445,126 B2
(45) Date of Patent: Sep. 13, 2016

(54) VIDEO FILTERING USING A COMBINATION OF ONE-DIMENSIONAL SWITCHED FILTER AND ONE-DIMENSIONAL ADAPTIVE FILTER

(75) Inventors: Wei-Jung Chien, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1191 days.

(21) Appl. No.: 13/339,002

(22) Filed: Dec. 28, 2011

(65) Prior Publication Data

US 2012/0170645 A1 Jul. 5, 2012

Related U.S. Application Data

(60) Provisional application No. 61/430,128, filed on Jan. 5, 2011, provisional application No. 61/451,011, filed on Mar. 9, 2011.

(51) Int. Cl.
| | |
|---|---|
| H04N 7/50 | (2006.01) |
| H04N 7/32 | (2006.01) |
| H04N 7/26 | (2006.01) |
| H04B 1/66 | (2006.01) |
| H04N 19/82 | (2014.01) |
| H04N 19/46 | (2014.01) |
| H04N 19/117 | (2014.01) |

(52) U.S. Cl.
CPC .......... *H04N 19/82* (2014.11); *H04N 19/117* (2014.11); *H04N 19/46* (2014.11)

(58) Field of Classification Search
CPC .................................. H04B 1/66; H04N 7/32
See application file for complete search history.

(56) References Cited

U.S. PATENT DOCUMENTS

| | | | |
|---|---|---|---|
| 5,852,475 A | 12/1998 | Gupta et al. | |
| 6,519,288 B1 | 2/2003 | Vetro et al. | |
| 8,036,273 B2 * | 10/2011 | Karczewicz et al. | .... 375/240.17 |
| 2003/0112864 A1 | 6/2003 | Karczewicz et al. | |
| 2006/0133689 A1 | 6/2006 | Andersson et al. | |
| 2009/0274216 A1 | 11/2009 | Kato et al. | |

(Continued)

FOREIGN PATENT DOCUMENTS

| | | |
|---|---|---|
| CN | 1537384 A | 10/2004 |
| EP | 2262267 A1 | 12/2010 |

(Continued)

OTHER PUBLICATIONS

Auyeung, et al., "Separable Adaptive Loop Filter," JCT-VC meeting; Jul. 21, 2010-Jul. 28, 2010; Geneva; (Joint Collaborative Team on Video Coding of ISO/IEC JTC1/SC29/WG11 and ITU-TSG.16); URL: HTTP://WFTP3.ITU.INT/AV-ARCH/JCTVC-SITE/, no. E/., No. JCTVC-B110, XP030007689, 10 pp.

(Continued)

*Primary Examiner* — Joseph Ustaris
*Assistant Examiner* — Maryam Nasri
(74) *Attorney, Agent, or Firm* — Shumaker & Sieffert, P.A.

(57) ABSTRACT

In one example, this disclosure describes a method of loop filtering of reconstructed video data during a video coding process. The method may comprising applying a one-dimensional (1D) switched filter to the video data in a first dimension that is either horizontal or vertical, and applying a 1D adaptive filter to the video data in a second dimension that is perpendicular to the first dimension.

53 Claims, 10 Drawing Sheets

(56) References Cited

U.S. PATENT DOCUMENTS

| | | | |
|---|---|---|---|
| 2010/0041534 A1 | 2/2010 | Harding et al. | |
| 2010/0158103 A1 | 6/2010 | Ye et al. | |
| 2010/0177822 A1 | 7/2010 | Karczewicz et al. | |
| 2010/0220788 A1* | 9/2010 | Wittmann et al. | 375/240.16 |
| 2010/0254450 A1* | 10/2010 | Narroschke et al. | 375/240.03 |
| 2010/0254463 A1 | 10/2010 | Narroschke et al. | |
| 2010/0322303 A1 | 12/2010 | Wada et al. | |
| 2010/0329362 A1* | 12/2010 | Choi | H04N 19/139 375/240.29 |
| 2012/0014436 A1* | 1/2012 | Segall et al. | 375/240.12 |
| 2012/0082242 A1 | 4/2012 | Narroschke et al. | |
| 2012/0140831 A1* | 6/2012 | Lee et al. | 375/240.24 |

FOREIGN PATENT DOCUMENTS

| | | |
|---|---|---|
| WO | 2009110160 A1 | 9/2009 |
| WO | 2010001614 A1 | 1/2010 |
| WO | 2010026770 A1 | 3/2010 |
| WO | 2010041534 A1 | 4/2010 |
| WO | WO2010063881 A1 | 6/2010 |
| WO | 2010083438 A2 | 7/2010 |
| WO | 2011019213 A2 | 2/2011 |
| WO | 2011126273 A2 | 10/2011 |

OTHER PUBLICATIONS

Yoshino, et al, "Enhanced Switching of Interpolation Filter for HEVC", Joint Collaborative Team on Video Coding (JCT-VC) of ITU-T SG16 WP3 and ISO/IEC JTC1/SC29/WG11, 3rd Meeting, JCTVC-C183, Oct. 7-15, 2010, 4 pp.
Japanese Office Action from Japanese Application No. 2013-548438 dated Jun. 10, 2014, 5 pp.
International Search Report and Written Opinion—PCT/US2011/067882—ISA/EPO—Apr. 12, 2012.
Siekmann et al: "Separable Wiener Filter Based Adaptive In-Loop Filter for Video Coding", Picture Coding Symposium 2010; Nagoya, Dec. 8, 2010.
U.S. Appl. No. 12/687,487, filed Jan. 14, 2010, by Marta Karcewicz.
International Telecommunication Union, "ITU-T H.264, Series H: Audiovisual and Multimedia Systems, Infrastructure of audiovisual services—Coding of moving video, Advanced video coding for generic audiovisual services," Mar. 2010, 669 pp.
Suzuki et al., "Description of Video Coding Technology Proposal by Sony," Joint Collaborative Team on Video Coding (JCT-VC) of ITU-T SG16 WP3 and ISO/IEC JTC1/SC29/WG11, Document JCTVC-A103, 1st Meeting: Dresden, DE, Apr. 15-23, 2010, 51 pp.
Chujoh et al., "Quadtree-Based Adaptive Loop Filter", ITU-T SG16 Contribution, C181.
Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 2011, JCTVC-G1103_d2, 214 pp.
International Preliminary Report on Patentability—PCT/US2011/067882—The International Bureau of WIPO Geneva, Switzerland, dated Apr. 29, 2013, 28 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011,193 pp.
Second Written Opinion from International patent application No. PCT/US2011/067882, dated Dec. 20, 2012, 5 pp.
Notice of Grounds for Rejection from counterpart Korean Application No. 2013-7019874, dated Aug. 30, 2014, 8 pp.
"Adaptive Loop Filter for Improving Coding Efficiency," ,Study Group 16—Contribution 402, International Telecommunication Union, Com 16—C 402—E, Apr. 2008, 3 pp.
Jung, "An Excel add-in for computing Bjontegaard metric and its evolution," ITU Telecommunications Standardization Sector, Document VCEG-AE07, Jan. 2007, 5 pp.
Tan, et al., "Recommened Simulation Common Conditions for Coding Efficiency Experiments Revision 1," ITU—Telecommunications Standardization Sector, Document VCEG-AE010, Jan. 13-19, 2007, 6 pp.
Karczewicz, et al., "Rate Distortion Optimized Quantization," ITU Telecommunications Standardization Sector, Document VCEG-AH21, 3 pp.
Chujoh, et al., "Block-based Adaptive Loop Filter," ITU Telecommunications Standardization Sector, Document VCEG-AI18, 6 pp.
Chujoh, et al., "Improvement of Block-based Adaptive Loop Filter," ITU Telecommunications Standarization Sector, Document VCEG-AJ13, Oct. 8-10, 2008, 4 pp.
Bjontegaard, "Calculation of average PSNR differences between RD-curves," ITU Telecommunications Standardization Sector, Document VCEG-M33, Apr. 2-4, 2001, 4 pp.
Chong, et al., "Encoder complexity analysis and performance report on adaptive loop filter", Joint Collaborative Team on Video Coding (JCT-VC) of ITU-T SG16 WP3 and ISO/IEC JTC1/SC29/WG11, 2nd Meeting: Geneva, CH, Jul. 2010, JCTVC-B095_r4, 5 pp.
European Office Action from corresponding European Application Serial No. 11811291.1 dated Aug. 4, 2015, 7 pp.

* cited by examiner

VIDEO FILTERING USING A COMBINATION OF ONE-DIMENSIONAL SWITCHED FILTER AND ONE-DIMENSIONAL ADAPTIVE FILTER

This application claims the benefit of U.S. Provisional Application No. 61/430,128, filed on Jan. 5, 2011 and U.S. Provisional Application No(s). 61/451,011, filed Mar. 9, 2011, the entire content of which is incorporated herein by reference.

TECHNICAL FIELD

This disclosure relates to block-based video coding techniques used to compress video data and, more particularly, filtering techniques performed during block-based video coding.

BACKGROUND

Digital video capabilities can be incorporated into a wide range of devices, including digital televisions, digital direct broadcast systems, wireless communication devices such as radio telephone handsets, wireless broadcast systems, personal digital assistants (PDAs), laptop or desktop computers, tablet computers, digital cameras, digital recording devices, video gaming devices, video game consoles, personal multimedia players, and the like. Such video devices may implement video compression techniques, such as those described in MPEG-2, MPEG-4, or ITU-T H.264/MPEG-4, Part 10, Advanced Video Coding (AVC), in order compress video data. Video compression techniques perform spatial and temporal prediction to reduce or remove redundancy inherent in video sequences. New standards, such as the High Efficiency Video Coding (HEVC) standard (which may ultimately be referred to as ITU-T H.265), continue to emerge and evolve.

Many video coding standards and techniques use block-based video coding. Block-based video coding techniques divide the video data of a video frame (or portion thereof) into video blocks and then encode the video blocks using predictive block-based compression techniques. The video blocks may be further divided into video block partitions. The video blocks (or partitions thereof) may be referred to as "coded units" and may be encoded using one or more video-specific encoding techniques as well as general data compression techniques. With the emerging HEVC standard, largest coded units (LCUs) may be divided into smaller and smaller coded units (CUs) according to a quadtree partitioning scheme, and the different CUs may be further partitioned into so-called prediction units (PUs). The CUs (or the PUs) may be encoded using motion estimation, motion compensation, transform coding such as discrete cosine transforms (DCT) that occur with respect to transform units (TUs) having one or more possible transform sizes, quantization, and variable length coding. Syntax information is often signaled with encoded video data, e.g., in a video slice header or video block header, in order to inform the decoder how to decode the video data.

Filtering techniques may be performed as part of the encoding and decoding process. Filtering may improve video quality by removing artifacts or smoothing pixel boundaries. Filtering between video block boundaries may be referred to as deblock filtering, but filtering may also be applied to pixels that are not located in block boundaries. Such filtering may be "in loop" or "post loop." With "in loop" filtering, the filtered pixels form reconstructed video data that may be used in the predictive coding (e.g., motion estimation and motion compensation) of other video data. In contrast, with "post loop" filtering, the unfiltered video data forms the reconstructed data that is used in the predictive coding of other video data. Thus, with "post loop" filtering, the filtering occurs outside of the coding loop and only applies to data that will be reconstructed and displayed. Therefore, with "post loop" filtering, the filtered data is not used for predictive coding, and instead, the unfiltered data is used for predictive coding.

SUMMARY

This disclosure relates to pixel filtering that occurs during a video encoding process or a video decoding process. Specifically, this disclosure relates to so-called "post loop" or so-called "in loop" pixel filtering that is commonly used to smooth pixel boundaries and possibly remove artifacts from reconstructed video data. According to this disclosure, a separable and adaptive loop filter (i.e., in loop or post loop) may include a one-dimensional (1D) adaptive filter and a 1D switched filter. The 1D switched filter may be chosen from a pre-defined filter set by substantially minimizing an error between the original signal and the decoded filtered signal. The 1D switched filter can be applied to one direction, usually a horizontal or a vertical direction. The 1D adaptive filter is then applied in the perpendicular direction relative to the 1D switched filter. However, it is also possible to first apply the 1D adaptive filter and then apply the 1D switch filter second. In either case, based on this design, an iterative filter design problem (i.e., possibly resulting in massive amounts of computations) can be avoided or reduced, while retaining coding performance that is similar to a technique that uses two different separable 1D adaptive filters.

In one example, this disclosure describes a method of loop filtering of reconstructed video data during a video coding process. The method comprises applying a 1D switched filter to the video data in a first dimension that is either horizontal or vertical, and applying a 1D adaptive filter to the video data in a second dimension that is perpendicular to the first dimension.

In another example, this disclosure describes a video coder apparatus that performs loop filtering of reconstructed video data during a video coding process. The video coder apparatus comprises a 1D switched filter that filters the video data in a first dimension that is either horizontal or vertical, and a 1D adaptive filter that filters the video data in a second dimension that is perpendicular to the first dimension.

In another example, this disclosure describes a device that performs loop filtering of reconstructed video data during a video coding process. The device comprises means for applying a 1D switched filter to the video data in a first dimension that is either horizontal or vertical, and means for applying a 1D adaptive filter to the video data in a second dimension that is perpendicular to the first dimension.

The techniques described in this disclosure may be implemented in hardware, software, firmware, or combinations thereof. If implemented in hardware, an apparatus may be realized as an integrated circuit, a processor, discrete logic, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a tangible computer-readable storage medium and loaded and executed in the processor.

Accordingly, this disclosure also contemplates a computer-readable storage medium comprising instructions that upon execution in a processor cause the processor to perform loop filtering of reconstructed video data during a video coding process, wherein the instructions upon execution cause the processor to apply a 1D switched filter to the video data in a first dimension that is either horizontal or vertical, and apply a 1D adaptive filter to the video data in a second dimension that is perpendicular to the first dimension.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
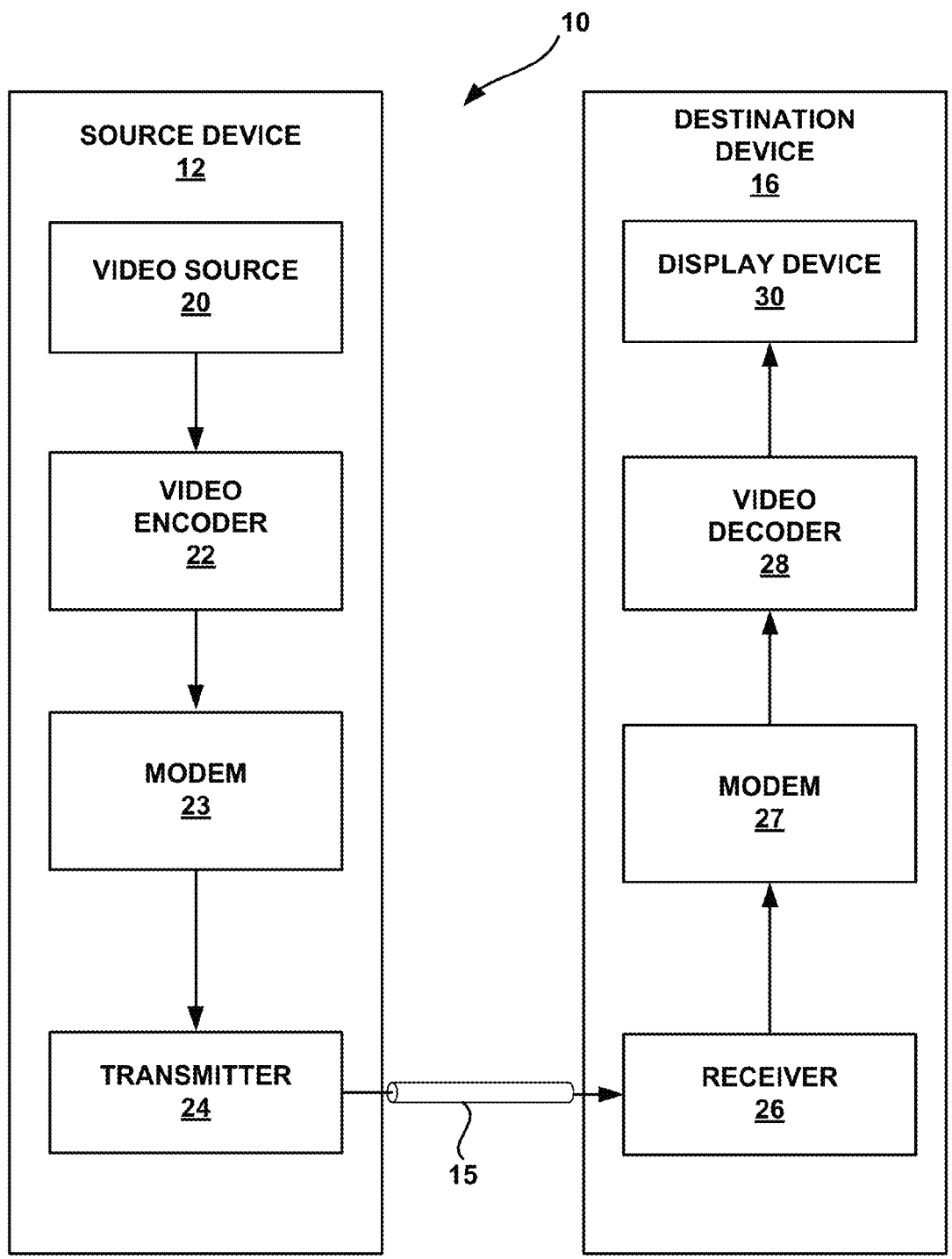
FIG. 1 is a block diagram illustrating a video encoding and decoding system that may implement one or more of the techniques of this disclosure.

This disclosure relates to pixel filtering that occurs during a video encoding process or a video decoding process. Specifically, this disclosure relates to so-called "post loop" or so-called "in loop" pixel filtering that is commonly used to smooth pixel boundaries and possibly remove artifacts from a reconstructed video data. In some cases, the loop filtering (e.g., in loop or post loop filtering) may occur after a deblock filtering process, which filters edges of video blocks. With loop filtering, the filtering may be applied and the filtered block may be compared to the original block in order to determine whether the filtering improved the video quality of the encoded block relative to the original block. A filter map may be generated and sent along with a slice of encoded data (e.g., wherein the slice is a video frame or portion thereof) in order to specify which ones of the video blocks in the slice should be filtered. The video blocks may comprise "coded units" or "prediction units" as defined in the emerging High Efficiency Video Coding (HEVC) standard, and may be defined according to a quadtree structure. The HEVC standard is sometimes referred to as ITU H.265

Loop filtering (e.g., in loop or post loop pixel filtering) may occur in two dimensions. That is, two-dimensional filtering may occur such that vertical and horizontal pixel boundaries are filtered. One aspect of this disclosure uses a "separable" filtering approach in which vertical filtering is separated from horizontal filtering. With separable filtering, one dimensional (1D) filtering can occur in a first dimension (e.g., vertical or horizontal) and then 1D filtering can occur again in the second dimension different from the first dimension. The order in which the 1D filtering occurs (vertical followed by horizontal OR horizontal followed by vertical) may not affect the result with separable filters.

Another aspect of this disclosure uses so-called "adaptive filtering." With adaptive filtering, the filter coefficients applied in the filtering process may be adaptively determined at an encoder, based on the data so as to achieve filtering that is desirable and possibly optimal. The adaptive filter coefficients may be communicated from the encoder to the decoder for each frame or slice, so that the decoder can apply the same filter coefficients that were adaptively determined and applied at the encoder.

Still another aspect of this disclosure uses so-called "switched filtering." With switched filtering, pre-defined sets of the filter coefficients are stored at the encoder and the decoder. The encoder may select the best set of filter coefficients for any coded unit, and may communicate a syntax element to the decoder. In this case, the syntax element may comprise an index that identifies the selected set of filter coefficients (from the pre-defined sets) so that the decoder can apply the same filter coefficients that were adaptively determined and applied at the encoder. Switched filtering has computational advantages (i.e., computational simplicity) relative to adaptive filtering, although adaptive filtering may achieve more desirable filtering than switched filtering. Adaptive filtering typically requires more syntax information in the bitstream relative to switched filtering, since the filter coefficients themselves are sent when adaptive filtering is used. Thus, the use of adaptive filtering or switched filtering may be viewed as a design trade-off that can affect the accuracy in the encoding, the computational complexity, and the level of compression that can be achieved.

According to this disclosure, a separable and adaptive loop filter (e.g., in loop or post loop) may include a 1D adaptive filter and a 1D switched filter. The 1D switched filter may be chosen from a pre-defined filter set by substantially minimizing an error between the original signal and the decoded filtered signal. The 1D switched filter can be applied to one direction, usually a horizontal or a vertical direction. The 1D adaptive filter can then be applied in the perpendicular direction relative to the 1D switched filter. However, it is also possible to first apply the 1D adaptive filter and then apply the 1D switch filter second. In either case, based on this design, an iterative filter design problem can be avoided or reduced, while retaining coding performance that is similar to a technique that uses two different separable 1D adaptive filters.

The techniques of this disclosure may also use a signaling scheme for communicating loop filter information from an encoding device to a decoding device, and the signaling may take place at least once per slice for a sequence of encoded video data. The slice may correspond to a set of largest coded units (LCUs) that define some or all of a video frame. LCUs may refer to coded units within the HEVC framework, which themselves may be sub-divided into smaller coded units according to quadtree portioning. With quadtree portioning, a square-shaped LCU is divided into four square shaped coded units, and the coded units may also be subdivided into smaller coded units according to quadtree portioning. Flags may be associated with each CU to indicate whether further quadtree portioning was used. An LCU may be sub-divided into four CUs, and the four CUs may each be further divided into smaller CUs. The HEVC standard may support up to three levels of quadtree portioning of the original LCU. After portioning the LCU into various CUS, the different CUs may be further partitioned into prediction units (PUs), which are video blocks that may assume square-shapes or other rectangular shapes.

According to this disclosure, an encoder selects a 1D switched filter and a 1D adaptive filter and applies the selected filters to reconstruct video data at the encoder. In addition, the encoder generates syntax information for signaling the selected filters to a decoder. Such filter signaling may occur once per slice for a sequence of encoded video data. The signaling may be implemented according to fixed length coding or variable length coding and may also incorporate predictive coding, e.g., in which the filter coefficients are coded using residual differences (or deltas) relative to previous filter coefficients or known filter coefficients.

The direction signaling may be designed to allow for signaling in all possible directions, including horizontal and vertical directions for either of the filters. In some cases, the switched filter set can be designed differently depending on the direction defined for the switched filter. The adaptive filter may have a flexible filter tap size or a fixed filter tap size. The filter support (i.e., the shape) of the filters may also be selectable. In some examples, two separate switch filters may be allowed in some cases (i.e., for some slices) to reduce complexity where an adaptive filter is not used.

In some examples, a deblocking filter may be applied in the decoding loop for a reconstructed picture to improve picture quality. Consistent with this disclosure, a 1D adaptive loop filter and a 1D switched loop filter may be added to the decoding loop after the deblocking filter to further improve the decoded picture quality for some or all video blocks (e.g., some or all CUs or PUs). To maintain picture quality and to reduce computation, non-separable filters can be applied to filter I-slices, while the separable 1D filters may be applied only in the filtering of P-slices and B-slices, or the like. In this manner, the techniques of this disclosure may be selectively applied to particular types of video slices, while other techniques may be used to other types of video slices.

Figure 5:
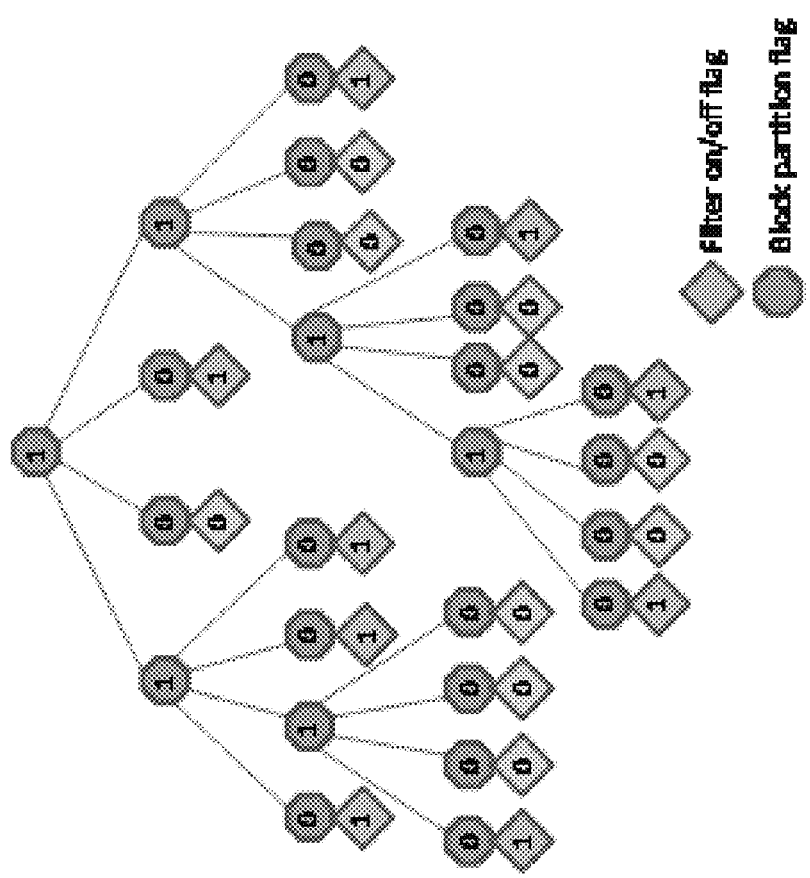
FIG. 5 is a decision tree representing partitioning decisions that results in the quadtree partitioning shown in FIG. 4.
Figure 4:
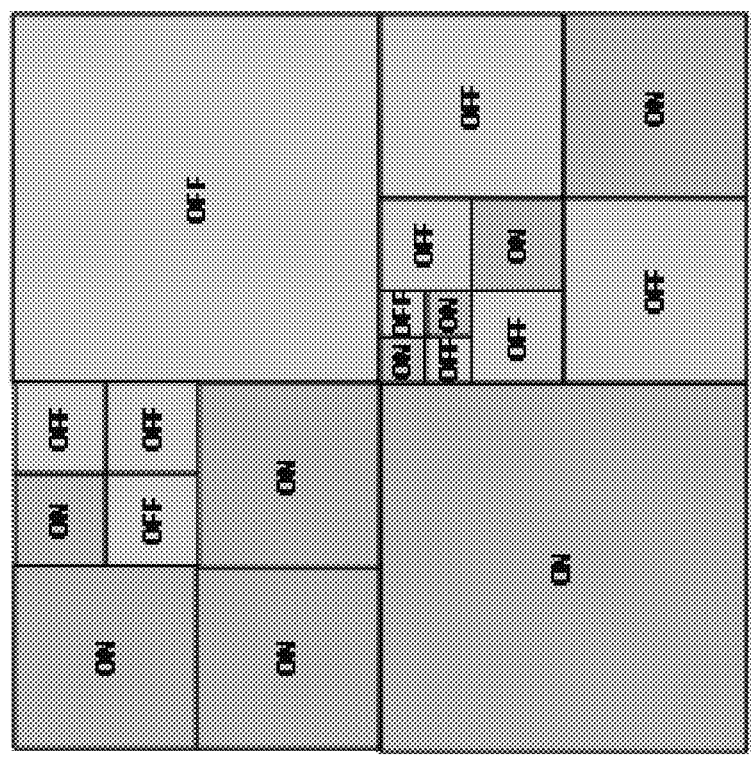
FIG. 4 is a conceptual diagram of video blocks partitioned according to a quadtree partitioning scheme.

A slice may be divided into video blocks (or LCUs) and each video block may be partitioned according to a quadtree structure. FIGS. 4 and 5 show one example of how a video block within a slice (e.g, an LCU) can be partitioned into sub-blocks (e.g., smaller CUs). As shown in FIG. 4, the quadtree sub-blocks indicated by "ON" may be filtered by loop filters described herein, while quadtree sub-blocks indicated by "OFF" may not be filtered. The decision of whether or not to filter a given block or sub-block may be determined at the encoder by comparing the filtered result and the non-filtered result relative to the original block being coded. FIG. 5 is a decision tree representing partitioning decisions that results in the quadtree partitioning shown in FIG. 4. FIGS. 4 and 5 may be individually or collectively viewed as a filter map that can be generated at an encoder and communicated to a decoder at least once per slice of encoded video data.

The techniques of this disclosure may apply to in-loop filtering or post-loop filtering. In-loop filtering and post-loop filtering are similar to one another in some respects. With in-loop filtering, the filtering of reconstructed video data occurs in the coding loop, which means that the filtered data is stored by an encoder or a decoder for subsequent use in the prediction of subsequent image data. In contrast, with post loop filtering, the filtering of reconstructed video data occurs out of the coding loop, which means that unfiltered versions of the data are stored by an encoder or a decoder for subsequent use in the prediction of subsequent image data. Thus, with post-loop filtering, the filtering may be applied to create reconstructed video data, but such filtering is not applied to the data for purposes of storing such data for use in other predictive encoding. At least one dimension of the in-loop filtering or the post-loop filtering, consistent with this disclosure may be adaptive in that the filtering coefficients applied in the filtering process are adaptively defined during the process. The other dimension may use a switched filter approach so as to reduce complexity relative to adaptive filtering in both dimensions.

In this disclosure, the term "coding" refers to encoding or decoding. Similarly, the term "coder" generally refers to any video encoder, video decoder, or combined encoder/decoder (codec). Accordingly, the term "coder" is used herein to refer to a specialized computer device or apparatus that performs video encoding or video decoding. The filtering techniques of this disclosure may be applicable to encoders or decoders. In some cases, filter syntax elements may be encoded into a bitstream in order to inform a decoder of the type of filtering that should be applied. This disclosure also defines a format for communicating encoded information that may improve the ability to encode filter information by encoding filter syntax information, e.g., in a header element or footer element associated with a slice of encoded data.

FIG. 1 is a block diagram illustrating an exemplary video encoding and decoding system 10 that may implement techniques of this disclosure. As shown in FIG. 1, system 10 includes a source device 12 that transmits encoded video to a destination device 16 via a communication channel 15. Source device 12 and destination device 16 may comprise any of a wide range of devices. In some cases, source device 12 and destination device 16 may comprise wireless communication device handsets, such as so-called cellular or satellite radiotelephones. The techniques of this disclosure, however, which apply more generally to video block and/or pixel filtering during video coding, are not necessarily limited to wireless applications or settings, and may be applied to non-wireless devices including video encoding and/or decoding capabilities.

In the example of FIG. 1, source device 12 may include a video source 20, a video encoder 22, a modulator/demodulator (modem) 23 and a transmitter 24. Destination device 16 may include a receiver 26, a modem 27, a video decoder 28, and a display device 30. In accordance with this disclosure, video encoder 22 of source device 12 may be configured to perform loop filtering of reconstructed video data during a video encoding process. The video encoding process may itself include a decoding loop in order to reconstruct the encoded data, and the loop filtering of this disclosure may take place in video encoder 22 as part of that decoding loop of the encoding process. The loop filtering may follow a deblock filtering process, and may include the application of a one-dimensional (1D) switched filter to the video data in a first dimension that is either horizontal or vertical, and application of a 1D adaptive filter to the video data in a second dimension that is perpendicular to the first dimension.

The filters may be selected as part of the encoding process, and encoder 22 may encode syntax information into the bitstream to identify the filters to a decoder. This encoded syntax information may include the filter coefficients for the 1D adaptive filter, and an index value to identify the 1D switched filter. Furthermore, encoder 22 may apply the loop filtering in a selective manner, e.g., filtering some video blocks and not filtering other video blocks. Encoder may filter each block and compare the filtered block and the unfiltered block to the original video block being encoded so as to determine whether filtering improved or degraded the reconstructed video block. Encoder 22 may generate a filter map that signals which blocks of a slice of encoded data should be filter and which blocks should remain unfiltered. Additional details regarding the encoding of the filter syntax information and the filter map is provided below.

Similar filtering techniques may also be performed by video decoder 28 of destination device 16. That is, video decoder 28 may also be configured to apply a 1D switched filter to the video data in a first dimension that is either horizontal or vertical, and apply a 1D adaptive filter to the video data in a second dimension that is perpendicular to the first dimension. On the decoding side, destination device 16 may receive the filter map and the filter syntax information at least once per slice of encoded data, wherein the slice refers to a set of largest coded units (LCUs) that define some or all of a video frame. In this manner, video decoder 28 can apply the loop filtering that is defined by encoder 22 based on the information that encoder 22 provides in the bitstream.

Again, the illustrated system 10 of FIG. 1 is merely exemplary. The filtering techniques of this disclosure may be performed by any encoding or decoding devices. Source device 12 and destination device 16 are merely examples of coding devices that can support such techniques.

Video encoder 22 of source device 12 may encode video data received from video source 20 using the techniques of this disclosure. Video source 20 may comprise a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22.

Once the video data is encoded by video encoder 22, the encoded video information may then be modulated by modem 23 according to a communication standard, e.g., such as code division multiple access (CDMA), orthogonal frequency division multiplexing (OFDM) or any other communication standard or technique. The encoded and modulated data can then be transmitted to destination device 16 via transmitter 24. Modem 23 may include various mixers, filters, amplifiers or other components designed for signal modulation. Transmitter 24 may include circuits designed for transmitting data, including amplifiers, filters, and one or more antennas. Receiver 26 of destination device 16 receives information over channel 15, and modem 27 demodulates the information. Again, the video decoding process performed by video decoder 28 may include similar filtering techniques to those of video encoder 22.

Communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to destination device 16.

Video encoder 22 and video decoder 28 may operate substantially according to a video compression standard such as the emerging HEVC standard. However, the techniques of this disclosure may be readily applied in the context of a variety of other video coding standards. Specifically, any standard that allows for loop filtering at the encoder or the decoder may benefit from the teaching of this disclosure.

Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like. In this disclosure, the term coder refers to an encoder or a decoder, and the terms coder, encoder and decoder all refer to specific machines designed for the coding (encoding or decoding) of video data consistent with this disclosure.

In some cases, devices 12, 16 may operate in a substantially symmetrical manner. For example, each of devices 12, 16 may include video encoding and decoding components. Hence, system 10 may support one-way or two-way video transmission between video devices 12, 16, e.g., for video streaming, video playback, video broadcasting, or video telephony.

During the encoding process, video encoder 22 may execute a number of coding techniques or operations. In general, video encoder 22 operates on video blocks within individual video frames (or other independently defined units of video such as slices) in order to encode the video blocks. Frames, slices, portions of frames, groups of pictures, or other data structures may be defined as units of video information that include a plurality of video blocks. The video blocks within coded units may have fixed or varying sizes, and may differ in size according to a specified coding standard. In some cases, each video frame may include a series of independently decodable slices, and each slice may include a series of video blocks, which may be arranged into even smaller blocks.

Macroblocks are one type of video block defined by the ITU H.264 standard and other standards. Macroblocks typically refer to 16 by 16 blocks of data. The ITU-T H.264 standard supports intra prediction in various block sizes, such as 16 by 16, 8 by 8, or 4 by 4 for luma components, and 8 by 8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. The emerging HEVC standard defines new terms for video blocks. In particular, with HEVC, video blocks (or partitions thereof) may be referred to as "coded units." With the HEVC standard, largest coded units (LCUs) may be divided into smaller and smaller coded units (CUs) according to a quadtree partitioning scheme, and the different CUs that are defined in the scheme may be further partitioned into so-called prediction units (PUs). The LCUs, CUs, and PUs are all video blocks within the meaning of this disclosure. Other types of video blocks may also be used, consistent with the HEVC standard or other video coding standards. Thus, the phrase "video blocks" refers to any size of video block. Moreover, video blocks may sometimes refer to blocks of video data in the pixel domain, or blocks of data in a transform domain such as a discrete cosine transform (DCT) domain, a domain similar to DCT, a wavelet domain, or the like. In most cases consistent with the techniques of this disclosure, however, the filtering of this disclosure may occur in the pixel domain.

Video encoder 22 may perform predictive coding in which a video block being coded is compared to a predictive frame (or other coded unit) in order to identify a predictive block. This process of predictive coding may be referred to as motion estimation and motion compensation. Motion estimation estimates video block motion relative to one or more predictive video blocks of one or more predictive frames (or other coded units). Motion compensation generates the desired predictive video block from the one or more predictive frames or other coded units. Motion compensation often includes an interpolation process in which interpolation filtering is performed to generate predictive data at fractional precision.

After generating the predictive block, the differences between the current video block being coded and the predictive block are coded as a residual block, and prediction syntax (such as a motion vector) is used to identify the predictive block. The residual block may be transformed and quantized. Transform techniques may comprise a DCT process or conceptually similar process, integer transforms, wavelet transforms, or other types of transforms. In a DCT process, as an example, the transform process converts a set of pixel values (e.g., residual values) into transform coefficients, which may represent the energy of the pixel values in the frequency domain. The ITU H.264 standard allows for transformations according to transformation units (TUs), which may be different for different CUs. The TUs are typically sized according to the size of CUs defined for a partitioned LCU, although this may not always be the case. Quantization is typically applied on the transform coefficients, and generally involves a process that limits the number of bits associated with any given transform coefficient.

Following transform and quantization, entropy coding may be performed on the quantized and transformed residual video blocks. Syntax elements, such as filter syntax information and prediction vectors defined during the encoding, may also be included in the entropy coded bitstream. In general, entropy coding comprises one or more processes that collectively compress a sequence of quantized transform coefficients and/or other syntax information. Scanning techniques, such as zig-zag scanning techniques, are performed on the quantized transform coefficients in order to define one or more serialized one-dimensional vectors of coefficients from two-dimensional video blocks. The scanned coefficients are then entropy coded along with any syntax information, e.g., via content adaptive variable length coding (CAVLC), context adaptive binary arithmetic coding (CABAC), or another entropy coding process.

As part of the encoding process, encoded video blocks may be decoded in order to generate the video data that is used for subsequent prediction-based coding of subsequent video blocks. This is often referred to as a decoding loop of the encoding process, and generally mimics the decoding that is performed by a decoder device. In the decoding loop, the loop filtering of this disclosure may be employed in order to improve video quality, and e.g., smooth pixel boundaries and possibly remove artifacts from decoded video. This loop filtering may be in-loop or post-loop. Again, with in-loop filtering, the filtering of reconstructed video data occurs in the coding loop, which means that the filtered data is stored by an encoder or a decoder for subsequent use in the prediction of subsequent image data. In contrast, with post-loop filtering the filtering of reconstructed video data occurs out of the coding loop, which means that unfiltered versions of the data are stored by an encoder or a decoder for subsequent use in the prediction of subsequent image data. The loop filtering often follows a separate deblock filtering process, which typically applies filtering to pixels that are on or near boundaries of adjacent video blocks in order to remove blockiness artifacts that manifest at video block boundaries.

Figure 2:
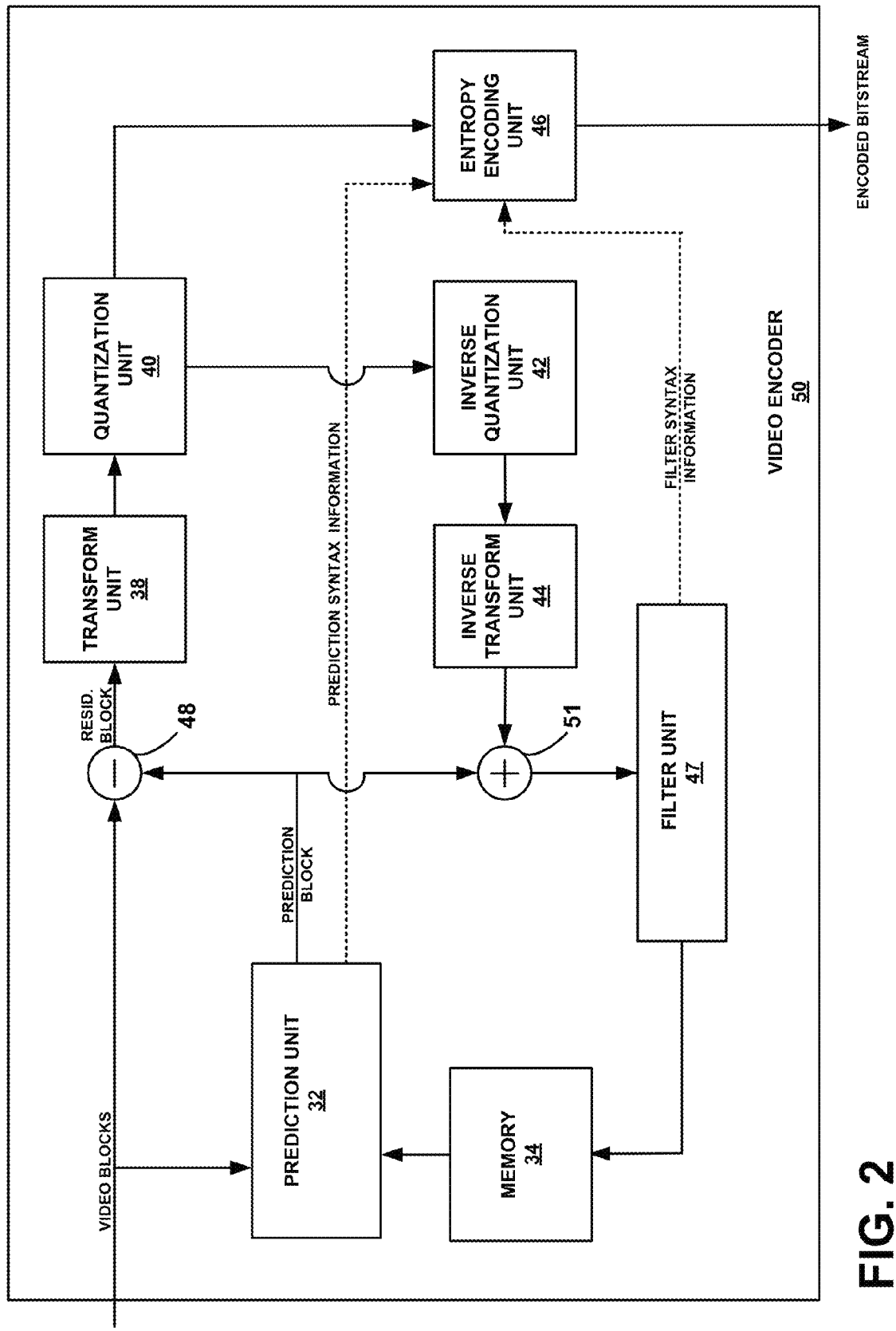
FIG. 2 is a block diagram illustrating an exemplary video encoder consistent with one or more examples of this disclosure.

FIG. 2 is a block diagram illustrating a video encoder 50 consistent with this disclosure. Video encoder 50 may correspond to video encoder 22 of device 20, or a video encoder of a different device. As shown in FIG. 2, video encoder 50 includes a prediction unit 32, adders 48 and 51, and a memory 34. Video encoder 50 also includes a transform unit 38 and a quantization unit 40, as well as an inverse quantization unit 42 and an inverse transform unit 44. Video encoder 50 also includes an entropy coding unit 46, and a filter unit 47. Filter unit 47 performs filtering consistent with this disclosure. In particular, filter unit 47 applies a 1D switched filter to the video data in a first dimension that is either horizontal or vertical, and applies a 1D adaptive filter to the video data in a second dimension that is perpendicular to the first dimension. Furthermore, filter unit 47 may select the filters and generate syntax information for inclusion in the encoded bitstream so as to identify the filters to a decoder. The generated syntax information may include the filter coefficients for the 1D adaptive filter, and an index value to identify the 1D switched filter.

In some examples, filter unit 47 may apply the loop filtering in a selective manner, e.g., filtering some video blocks and not filtering other video blocks. Filter unit 47 may filter each block and compare the filtered block and the unfiltered block to the original video block being encoded so as to determine whether filtering improved or degraded the reconstructed video block. Filter unit 47 may also generate a filter map that signals which blocks of a slice of encoded data should be filtered and which blocks should remain unfiltered. This filter map, as well as the other filter syntax information, may be communicated from filter unit 47 to entropy encoding unit 46. The filter syntax information, e.g., the filter map, the index for the 1D switched filter and the coefficients for the 1D adaptive filter may be included in a slice header (or other syntactical data structure) associated with an encoded video slice. Again, a slice generally refers to an entire frame or a portion of a frame, and typically includes a set of LCUs and slice-level syntax information applicable to the LCUs or smaller video blocks included in the LCUs.

Generally, during the encoding process, video encoder 50 receives a video block to be coded, and prediction unit 32 performs predictive coding techniques. The video block may comprise a CU or a PU as outlined above, or may generally comprise any block of video data consistent with a block-based video coding technique or standard. For inter coding, prediction unit 32 compares the video block to be encoded to various blocks in one or more video reference frames or slices (e.g., one or more "list" of reference data) in order to define a predictive block. For intra coding, prediction unit 32 generates a predictive block based on neighboring data within the same coded unit. Prediction unit 32 outputs the prediction block and adder 48 subtracts the prediction block from the video block being coded in order to generate a residual block.

For inter coding, prediction unit 32 may comprise motion estimation and motion compensation units that identify a motion vector that points to a prediction block and generates the prediction block based on the motion vector. Typically, motion estimation is considered the process of generating the motion vector, which estimates motion. For example, the motion vector may indicate the displacement of a predictive block within a predictive frame relative to the current block being coded within the current frame. Motion compensation is typically considered the process of fetching or generating the predictive block based on the motion vector determined by motion estimation. For intra coding, prediction unit 32 generates a predictive block based on neighboring data within the same coded unit. One or more intra-prediction modes may define how an intra prediction block can be defined.

Motion compensation for inter-coding may include interpolations to sub-pixel resolution. Accordingly prediction unit 32 may include one or more interpolation filters to interpolate prediction data to half-pixel resolution, quarter-pixel resolution, or even finer resolution. This permits the motion estimation process to estimate motion of video blocks to such sub-pixel resolution.

After prediction unit 32 outputs the prediction block, and after adder 48 subtracts the prediction block from the video block being coded in order to generate a residual block, transform unit 38 applies a transform to the residual block. The transform may comprise a discrete cosine transform (DCT) or a conceptually similar transform such as that defined by the ITU H.264 standard or the HEVC standard. In some examples, consistent with the HEVC standard, the size of the transform may vary for different CUs, e.g., depending on the level of partitioning that occurs with respect to a given LCU. Transform units (TUs) may be defined in order to set the transform size. Wavelet transforms, integer transforms, sub-band transforms or other types of transforms could also be used. In any case, transform unit applies the transform to the residual block, producing a block of residual transform coefficients. The transform, in general, may convert the residual information from a pixel domain to a frequency domain.

Quantization unit 40 then quantizes the residual transform coefficients to further reduce bit rate. Quantization unit 40, for example, may limit the number of bits used to code each of the coefficients. After quantization, entropy coding unit 46 may scan and entropy encode the data. For example, entropy coding unit 46 may scan the quantized coefficient block from a two-dimensional representation to one or more serialized one-dimensional vectors. The scan order may be pre-programmed to occur in a defined order (such as zig-zag scanning or another pre-defined order), or possibly adaptive defined based on previous coding statistics. Following this scanning process, entropy encoding unit 46 encodes the quantized transform coefficients (along with any syntax elements such as the filter syntax information described herein) according to an entropy coding methodology. Examples of entropy coding techniques that may be used by entropy coding unit 46 include context adaptive variable length coding (CAVLC) and context adaptive binary arithmetic coding (CABAC). Syntax elements included in the entropy coded bitstream may include prediction syntax from prediction unit 32, such as motion vectors for inter coding or prediction modes for intra coding. Syntax elements included in the entropy coded bitstream may also include filter information from filter unit 47, which can be encoded in the manner described herein.

CAVLC is one type of entropy coding technique supported by the ITU H.264 standard and the emerging HEVC standard, which may be applied on a vectorized basis by entropy coding unit 46. CAVLC uses variable length coding (VLC) tables in a manner that effectively compresses serialized "runs" of transform coefficients and/or syntax elements. CABAC is another type of entropy coding technique supported by the ITU H.264 standard or the HEVC standard, which may be applied on a vectorized basis by entropy coding unit 46. CABAC may involve several stages, including binarization, context model selection, and binary arithmetic coding. In this case, entropy coding unit 46 codes transform coefficients and syntax elements according to CABAC. Many other types of entropy coding techniques also exist, and new entropy coding techniques will likely emerge in the future. This disclosure is not limited to any specific entropy coding technique.

Following the entropy coding by entropy encoding unit 46, the encoded video may be transmitted to another device or archived for later transmission or retrieval. Again, the encoded video may comprise the entropy coded vectors and various syntax information (including the filter information described herein), which can be used by the decoder to properly configure the decoding process. Inverse quantization unit 42 and inverse transform unit 44 apply inverse quantization and inverse transform, respectively, to reconstruct the residual block in the pixel domain. Summer 51 adds the reconstructed residual block to the prediction block produced by prediction unit 32 to produce a reconstructed video block for storage in memory 34. Prior to such storage, however, filter unit 47 may apply filtering to the video block to improve video quality. Such filtering by filter unit 47 may reduce artifacts and smooth pixel boundaries. Moreover, filtering may improve compression by generating predictive video blocks that comprise close matches to video blocks being coded.

Again, filter unit 47 applies a 1D switched filter and a 1D adaptive filter, consistent with this disclosure, and applies the selected filters to reconstruct video data for storage in memory 34. In addition, the filter unit 47 generates syntax information for signaling the selected filters to a decoder. Such filter syntax information may be generated occur once per slice for a sequence of encoded video data, and forwarded to entropy coding unit 46 for inclusion in the bitstream, e.g., as part of a slice header. In particular, filter unit 47 may select the 1D switched filter, generating a syntax element that identifies an index of the 1D switched filter with respect to a set of 1D switched filters, and identify coefficients for the 1D adaptive filter. Filter unit 47 may select the 1D switched filter, generate the syntax element, and identify the coefficients for the 1D adaptive filter occurs at least once per slice for a sequence of encoded video data, wherein the slice corresponds to a set of LCUs that define some or all of a video frame. In some cases, filter unit 47 may also generate a syntax element that defines a direction associated with either the 1D switched filter or the 1D adaptive filter, which may also occur at least once per slice. For some slices, e.g., in order to further reduce complexities, filter unit 47 may apply a first 1D switched filter to the video data in the first dimension that is either horizontal or vertical, and apply a second 1D switched filter in the second dimension that is perpendicular to the first dimension.

The filtering may be performed only with respect to a subset of CUs of a slice. In this case, filter unit 47 may generate a filter map that defines the subset of coded units of the slice that are filtered. Filter unit 47 may actually filter every video block (e.g., every CU and PU of a slice), but may determine whether or not the filtering improved the video quality. If so, filter unit 47 may turn the filtering on with respect to that given video block by coding a flag in the filter map to indicate that filtering should be turned on for that video block. The filtering of this disclosure may be referred to as "loop filtering" (e.g., so-called "in loop filtering" or so-called "post loop" filtering). The loop filtering may occur after a deblock filtering process that filters edges of video blocks. Accordingly, filter unit 47, in some examples, may also perform deblock filtering prior to the loop filtering described in this disclosure.

Figure 3:
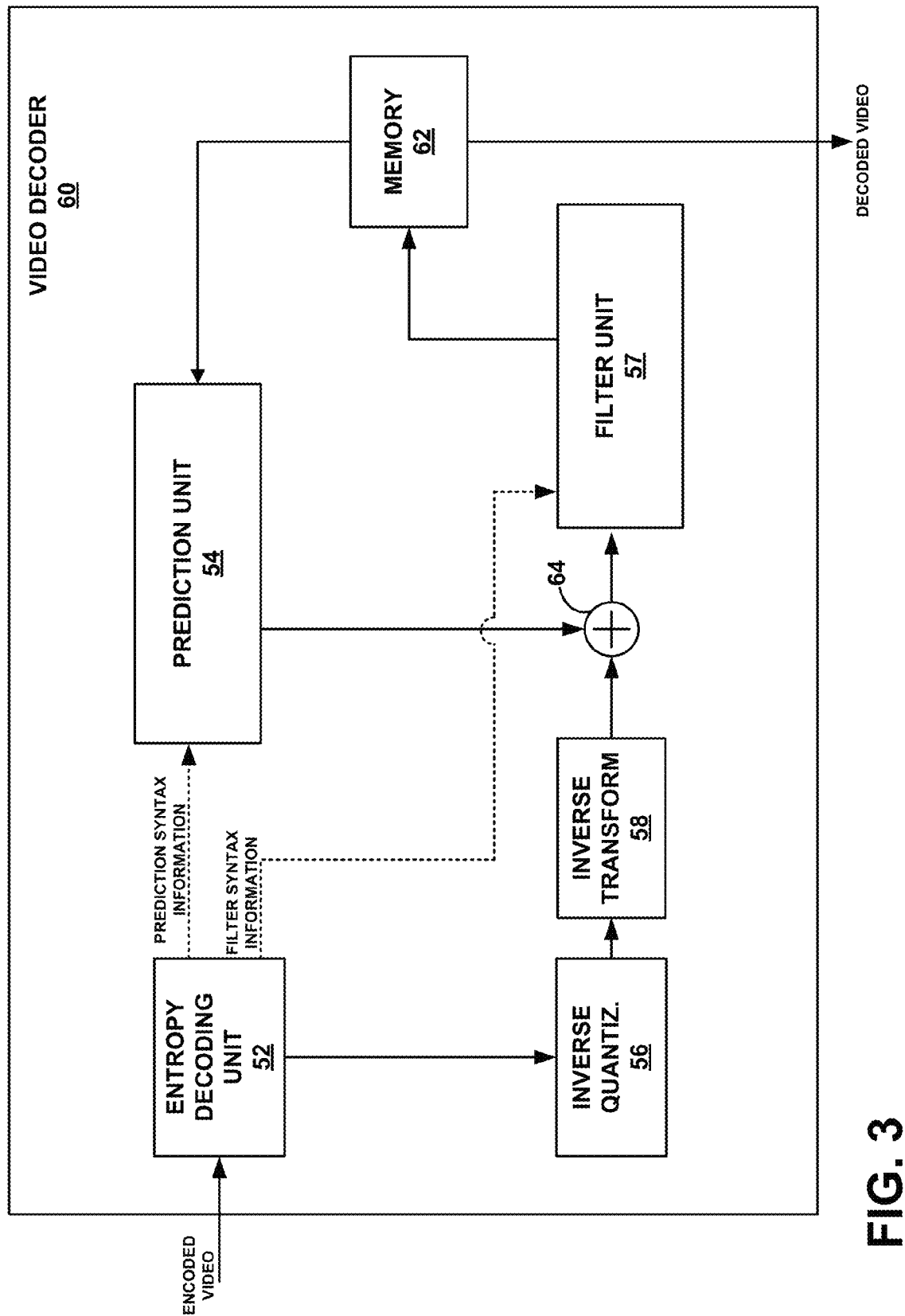
FIG. 3 is a block diagram illustrating an exemplary video decoder consistent with one or more examples of this disclosure.

FIG. 3 is a block diagram illustrating an example of a video decoder 60, which decodes a video sequence that is encoded in the manner described herein. The filtering techniques of this disclosure may be performed by video decoder 60 in some examples. A video sequence received at video decoder 60 may comprise an encoded set of image frames, a set of frame slices, a commonly coded group of pictures (GOPs), or a wide variety of units of video information that include encoded video blocks (such as CUs and possibly PUs) and syntax information to define how to decode such video blocks.

Video decoder 60 includes an entropy decoding unit 52, which performs the reciprocal decoding function of the encoding performed by entropy encoding unit 46 of FIG. 2. In particular, entropy decoding unit 52 may perform CAVLC or CABAC decoding, or any other type of entropy decoding used by video encoder 50. Entropy decoded video blocks in a one-dimensional serialized format may be converted from one or more one-dimensional vectors of coefficients back into a two-dimensional block format. The number and size of the vectors, as well as the scan order defined for the video blocks may define how the two-dimensional block is reconstructed. Entropy decoded prediction syntax may be sent from entropy decoding unit 52 to prediction unit 54, and entropy decoded filter information may be sent from entropy decoding unit 52 to filter unit 57.

Video decoder 60 also includes a prediction unit 54, an inverse quantization unit 56, an inverse transform unit 58, a memory 62, and a summer 64. In addition, video decoder 60 also includes a filter unit 57 that filters the output of summer 64. Consistent with this disclosure, filter unit 57 may receive entropy decoded filter information and may apply loop filtering consistent with this disclosure. As with video encoder 50, video decoder 60 includes a prediction unit 54 and a filter unit 57. Prediction unit 54 of video decoder 60 may include motion compensation elements and possibly one or more interpolation filters for sub-pixel interpolation in the motion compensation process.

As with video encoder 50, in video decoder 60, filter unit 57 applies a 1D switched filter and a 1D adaptive filter, consistent with this disclosure, and applies the selected filters to reconstruct video data for storage in memory 34. On the decoding side, video decoder 60 may receive a filter map that defines a subset of coded units of the slice that are filtered, and may apply filtering to those video blocks that the filter map identifies for such filtering. Video decoder 60 may receive an index of the 1D switched filter that identifies the 1D switched filter with respect to a set of 1D switched filters, and receive information identifying coefficients for the 1D adaptive filter. This syntax information (e.g., the filter map, the index for the 1D switched filter and the coefficients for the 1D adaptive filter may be received in the bitstream at least once per slice for a sequence of encoded video data.

The syntax information may also include information that identifies a direction associated with either the 1D switched filter or the 1D adaptive filter.

According to this disclosure, the encoder selects a 1D switched filter and a 1D adaptive filter and applies the selected filters to reconstruct video data at the encoder. In addition, the encoder generates syntax information for signaling the selected filters to a decoder. The decoder then applies the same filtering that was selected and defined by the encoder. As explained, the filter signaling may occur once per slice for a sequence of encoded video data. As one example, the signaling be defined according the following pseudocode:

1. Signal the direction for the 1D switched filter (or for the adaptive filter),
2. Signal the filter index of the 1D switched filter, and
3. Signal the coefficients of the 1D adaptive filter.

All of this signaling may be implemented according to fixed length coding or variable length coding and may also incorporate predictive coding, e.g., in which the filter coefficients are coded using residual differences (or deltas) relative to previous filter coefficients or known filter coefficients.

The direction signaling may be designed to cover all possible directions in which the filters might be applied, including horizontal and vertical directions for either of the filters. In some cases, the switched filter set can be designed differently depending on the direction defined for the switched filter. The adaptive filter may have a flexible filter tap size or a fixed filter tap size. The filter support (i.e., the shape) of the filters may also be selectable. Any such filter features (e.g., the filter size, the filter shape, the filter coefficients, etc.) may be communicated from the encoder to the decoder at least once per slice of encoded data.

In another example, two separate switch filters may be allowed in some cases (i.e., for some slices) to reduce complexity where an adaptive filter is not used. In this case, the signaling may be define by the following pseudocode:

1. Signal whether two 1D switch filters are applied.
If yes, goto 2. Otherwise, goto 5.
2. Signal the directions for the 1D switched filters.
3. Signal the filter indices of the 1D switched filters.
4. Goto 8.
5. Signal the direction for the 1D switched filter (or for the adaptive filter).
6. Signal the filter index of the 1D switch filter.
7. Signal the coefficients of the 1D adaptive filter.
8. End As explained, a deblocking filter may be applied by the decoder, or in the decoding loop of the encoder for a reconstructed picture, to improve picture quality. Consistent with this disclosure, a 1D adaptive loop filter and a 1D switched loop filter may be added to the decoding process (in the encoder and the decoder) after the deblocking filter to further improve the decoded picture quality for some or all video blocks (e.g., some or all CUs or PUs). To maintain picture quality and to reduce computation, non-separable filters can be applied to filter I-slices, while the separable 1D filters may be applied only in the filtering of P-slices and B-slices, or the like. In this manner, the techniques of this disclosure may be selectively applied to particular types of video slices, while other techniques may be used to other types of video slices.

A slice may be divided into video blocks (or LCUs) and each video block may be partitioned according to a quadtree structure. As mentioned above, FIGS. 4 and 5 show one example on how a video block within a slice (e.g, an LCU)

can be partitioned into sub-blocks (e.g., smaller CUs). As shown in FIG. 4, the quadtree sub-blocks indicated by "ON" may be filtered by loop filters described herein, while quadtree sub-blocks indicated by "OFF" may not be filtered. The decision of whether or not to filter a given block or sub-block may be determined at the encoder by comparing the filtered result and the non-filtered result relative to the original block being coded. FIG. 5 is a decision tree representing partitioning decisions that results in the quadtree partitioning shown in FIG. 4.

In particular, FIG. 4 may represent a large video block that is partitioned according to a quadtree portioning scheme into smaller video blocks of varying sizes. Each video block is labelled (on or off) in FIG. 4, to illustrate whether filtering should be applied or avoided for that video block. The video encoder may define this filter map by comparing filtered and unfiltered versions of each video block to the original video block being coded.

Again, FIG. 5 is a decision tree corresponding to partitioning decisions that result in the quadtree partitioning shown in FIG. 4. In FIG. 5, each circle may correspond to a CU. If the circle includes a "1" flag, then that CU is further partitioned into four more CUs, but if the circle includes a "0" flag, then that CU is not partitioned any further. Each circle (e.g., corresponding to CUs) also includes an associated triangle. If the flag in the triangle for a given CU is set to 1, then filtering is turned "ON" for that CU, but if the flag in the triangle for a given CU is set to 0, then filtering is turned off. In this manner, FIGS. 4 and 5 may be individually or collectively viewed as a filter map that can be generated at an encoder and communicated to a decoder at least once per slice of encoded video data in order to communicate the level of quadtree partitioning for a given video block (e.g., an LCU) whether or not to apply filtering to each partitioned video block (e.g., each CU within the LCU).

Figure 6:
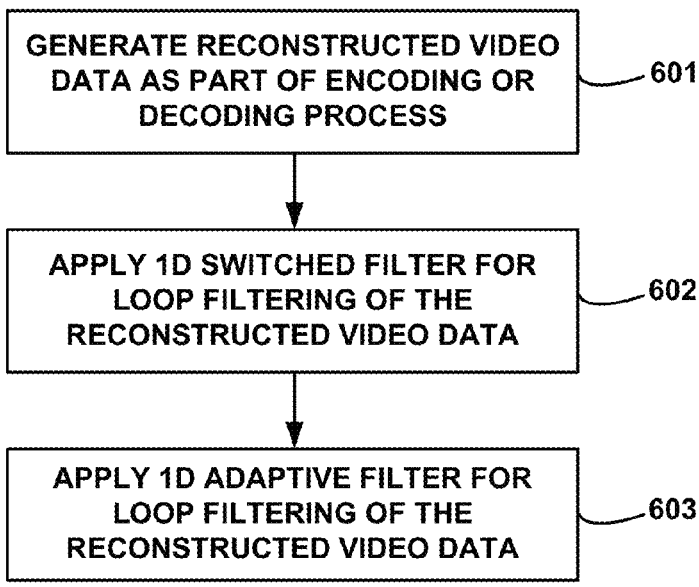
FIGS. 6-13 are flow diagrams illustrating techniques consistent with this disclosure.

FIG. 6 is a flow diagram illustrating a process that may be performed by a video encoder or a video decoder. FIG. 6 will be described from the perspective of video encoder 50 of FIG. 2 and video decoder 60 of FIG. 3, although other devices or coders could also perform the process. As shown in FIG. 6, video encoder 50 or video decoder 60 generates reconstructed video data as part of an encoding process or a decoding process (601). For the encoding process, this generation of reconstructed video data may correspond to the decoding loop of video encoder 50.

Filter unit 47 of video encoder 50 or filter unit 57 of video decoder 60 applies a 1D switched filter for loop filtering of the reconstructed video data (602). As mentioned, this loop filter may be performed to only a subset of the video blocks of a slice, and may follow a deblock filtering process, which may also be performed by the filter units 47 and 57. In any case, filter unit 47 or filter unit 57 then applies a 1D adaptive filter for loop filtering of the encoded data (603). The use of a 1D adaptive filter and a 1D switched filter can provide filtering quality that approaches the level of quality that could be achieved with two 1D adaptive filters, but does so in a manner that reduces complexity relative to the use of two 1D adaptive filters. It should also be noted that order of application of the 1D adaptive filter and the 1D switched filter could be reversed. In other words, the 1D filters may be separable filters. However, in other cases, 1D adaptive filter that is used for the filtering could also be used to define a set of 1D switched filters so that an index for the 1D switched filter applies to a set of 1D switched filters that are defined based on the 1D adaptive filter. In this later case, the 1D filters may not be separable filters.

Figure 7:
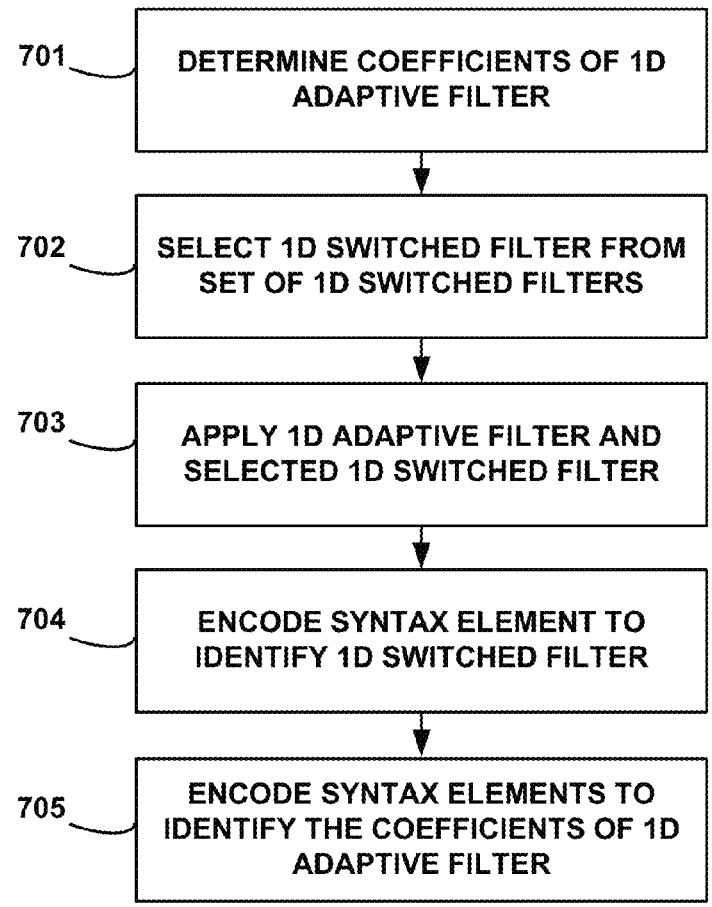

FIG. 7 is a flow diagram illustrating a process that may be performed by a video encoder consistent with this disclosure. FIG. 7 will be described from the perspective of video encoder 50 of FIG. 2, although other devices or coders could also perform the process. As shown in FIG. 7, filter unit 47 of video encoder 50 determines coefficients of a 1D adaptive filter (701), such as by applying different filter coefficients and assessing the quality of the filtering. This process of determining the adaptive filter coefficients may be an exhaustive search, or could involve a more limited search of possible coefficients.

Filter unit 47 may also select a 1D switched filter from a set of 1D switched filters (702). The process of selecting the 1D switched filter may be similar to the adaptive filtering process in that different sets of filter coefficients are considered. However, the process of selecting the 1D switched filter may also be a simpler process relative to adaptive filtering because the 1D switched filter is selected from a more limited set of pre-defined possibilities.

Once selected, filter unit 47 applies the 1D adaptive filter and the 1D switched filter (703), e.g., in horizontal and vertical dimensions (or vice versa). Diagonal filtering might also be used, as long as the two different 1D filters are oriented perpendicularly relative to one another. In any case, filter unit 47 encodes a syntax element (such as a filter index) to identify the selected 1D switched filter relative to the set of pre-defined switched filters (704). In addition, filter unit 47 encodes further syntax elements to identify the coefficients of the 1D adaptive filter (705). This encoding may occur at least once per slice of encoded data so that the encoded bitstream includes the filter information needed to decode each slice.

Figure 8:
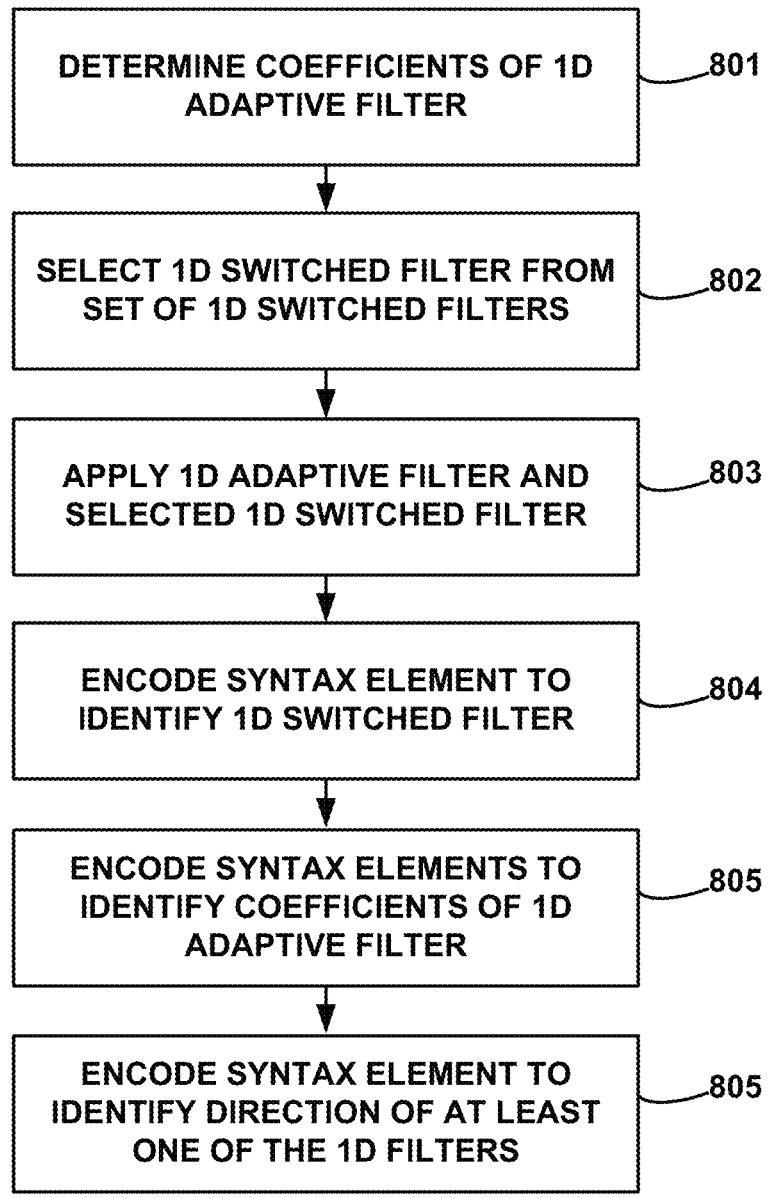

FIG. 8 is a flow diagram illustrating a process that may be performed by a video encoder consistent with this disclosure. FIG. 8 is very similar to FIG. 7, and will be described from the perspective of video encoder 50 of FIG. 2, although other devices or coders could also perform the process. As shown in FIG. 8, filter unit 47 of video encoder 50 determines coefficients of a 1D adaptive filter (801), such as by applying different filter coefficients and assessing the quality of the filtering. Again, this process of determining the adaptive filter coefficients may be an exhaustive search, or could involve a more limited search of possible coefficients.

Filter unit 47 may also select a 1D switched filter from a set of 1D switched filters (802). Once selected, filter unit 47 applies the 1D adaptive filter and the 1D switched filter (803), e.g., in horizontal and vertical dimensions (or vice versa). Diagonal filtering might also be used in other examples. In any case, filter unit 47 encodes a syntax element (such as a filter index) to identify the selected 1D switched filter relative to the set of pre-defined switched filters (804). In addition, filter unit 47 encodes further syntax elements to identify the coefficients of the 1D adaptive filter (805). Furthermore, filter unit 47 may encode yet another syntax element to identify the direction (e.g., horizontal or vertical) associated with at least one of the 1D filters (806). Given the direction of one of the filters, the direction associated with the other 1D filters can be implied by the decoder. As with other examples, this encoding of filter information may occur at least once per slice of encoded data so that the encoded bitstream includes the filter information needed to decode each slice.

Figure 9:
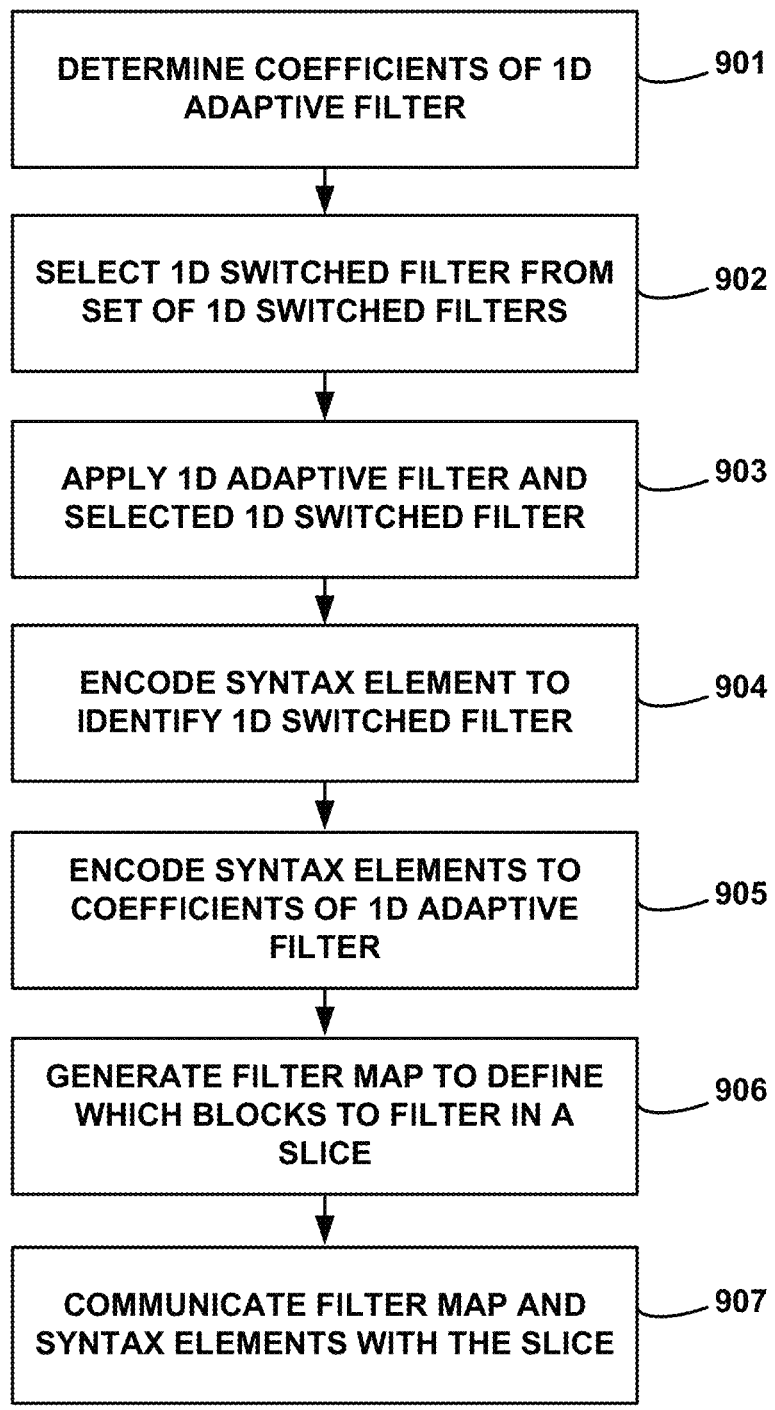

FIG. 9 is another flow diagram illustrating a process that may be performed by a video encoder consistent with this disclosure. FIG. 9 is similar to FIGS. 7 and 8, and will be described from the perspective of video encoder 50 of FIG. 2, although other devices or coders could also perform the process. As shown in FIG. 9, filter unit 47 of video encoder 50 determines coefficients of a 1D adaptive filter (901), such as by applying different filter coefficients and assessing the quality of the filtering. Again, this process of determining the adaptive filter coefficients may be an exhaustive search, or could involve a more limited search of possible coefficients.

Filter unit 47 may also select a 1D switched filter from a set of 1D switched filters (902). Once selected, filter unit 47 applies the 1D adaptive filter and the 1D switched filter (903), e.g., in horizontal and vertical dimensions (or vice versa). Diagonal filtering might also be used in other examples. In any case, filter unit 47 encodes a syntax element (such as a filter index) to identify the selected 1D switched filter relative to the set of pre-defined switched filters (904). In addition, filter unit 47 encodes further syntax elements to identify the coefficients of the 1D adaptive filter (905).

In the example of FIG. 9, filter unit 47 may generate a filter map to define which blocks within a slice should be filtered (906), and which blocks should remain unfiltered. Filter unit 47 may compare filtered and unfiltered blocks to the video blocks being coded in order to determine whether to filter or not to filter such blocks. As mentioned above, FIGS. 4 and 5 may be individually or collectively viewed as a filter map that can be generated at an encoder and communicated to a decoder at least once per slice of encoded video data in order to communicate the level of quadtree partitioning for a given video block (e.g., an LCU) whether or not to apply filtering to each partitioned video block (e.g., each CU within the LCU). A video coding device (e.g., source device 12) may communicate the filter map and the syntax elements with the slice of encoded data (907) so that the proper filtering can be applied by destination device based on the filter map and the syntax elements. For example, the filter map and syntax elements may be communicated in a slice header, slice footer, or other data element of the bitsteam known by the decoder to define syntax for the slice. The filter map may also be referred to as part of "filter syntax information" associated with a slice of encoded data.

Figure 10:
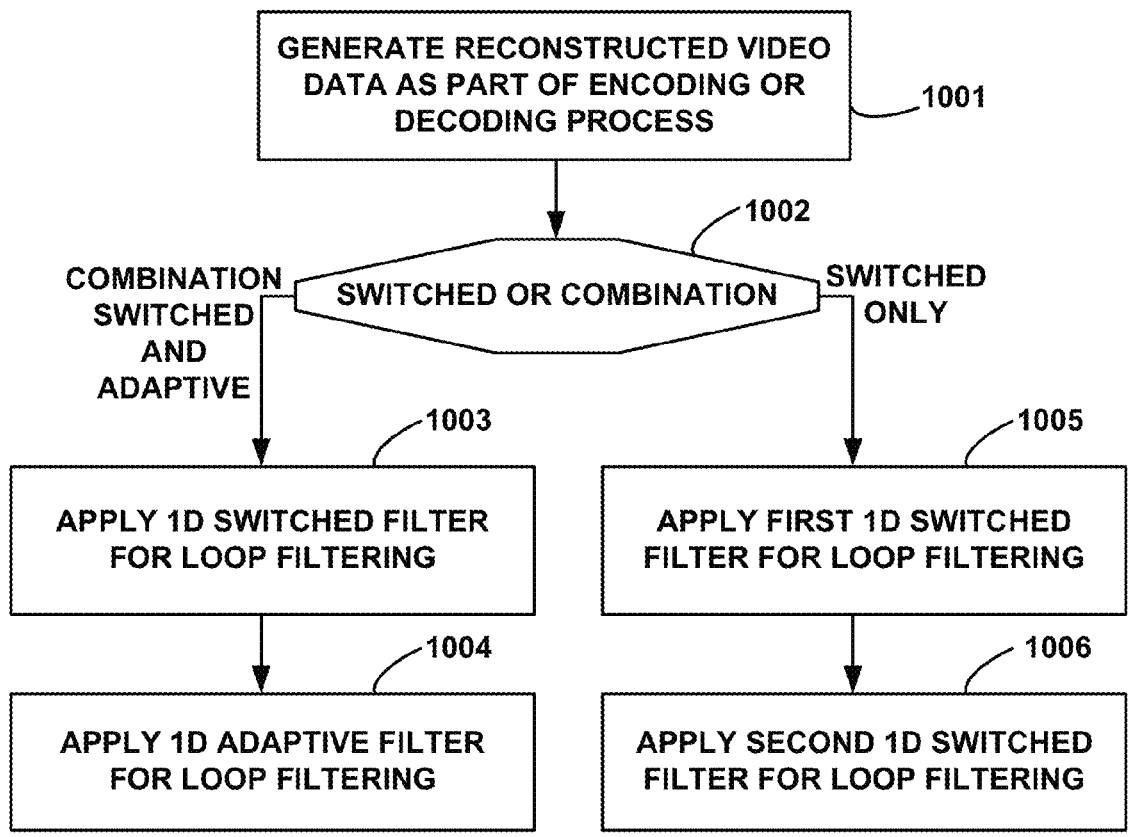

FIG. 10 is another flow diagram illustrating a process that may be performed by a video encoder consistent with this disclosure. In this case, the video encoder may perform different types of filtering to different slices of video data within a video sequence. In particular, according to FIG. 10, some slices may be filtered according to a 1D adaptive filter and a 1D switched filter (consistent with this disclosure), while other frames may only use switched filters. FIG. 10 will be described from the perspective of video encoder 50 of FIG. 2, although other devices or coders could also perform the process. As shown in FIG. 10, video encoder 50 generates reconstructed video data as part of an encoding process (1001). For the encoding process, this generation of reconstructed video data may correspond to the decoding loop of video encoder 50.

Filter unit 47 of video encoder 50 or filter unit 57 of video decoder 60 determines whether to use switched filtering only or a combination of switched and adaptive filtering (1002). This decision may be performed based on a wide variety of factors, such as available processing capabilities, available bandwidth, whether or not adaptive filtering occurred in previous slices, video quality, or other factors. If, for a given slice, filter unit 47 determines that a combination of switched and adaptive filtering should be applied, filter unit 47 applies both a 1D switched filter (1003) and a 1D adaptive filter (1004). However, if filter unit 47 determines, for the given slice, that switched only filtering should be applied for that slice, then filter unit 47 applies a first 1D switched filter (1005) and a second 1D switched filter (1006). Filter unit may generate syntax to indicate the decision (combination or switched only), as well as the appropriate filter syntax information associated with the decision.

Figure 11:
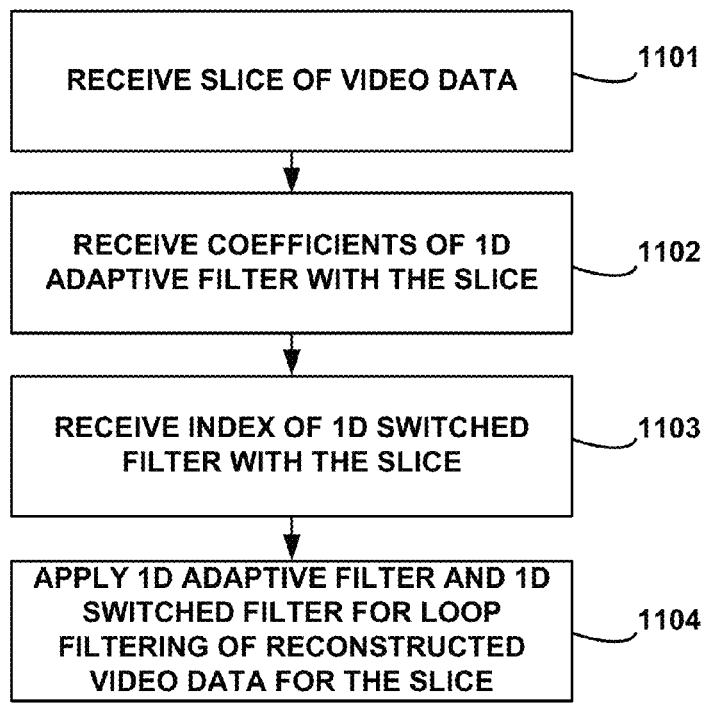

FIG. 11 is a flow diagram illustrating a process that may be performed by a video decoder consistent with this disclosure. FIG. 11 will be described from the perspective of video decoder 60 of FIG. 3 although other devices may also perform the process. As shown in FIG. 11, entropy decoding unit 52 of video decoder receives a slice of video data (1101), receives coefficients of a 1D adaptive filter with the slice (1102), and receives an index of a 1D switched filter with the slice (1103). This information may be entropy decoded, e.g., from a slice header, and forwarded to filter unit 57. Based on this information, filter unit 57 applies the appropriate 1D adaptive filter using the received coefficients and the appropriate 1D switched filter for loop filtering of the reconstructed video data for the slice (1105).

Figure 12:
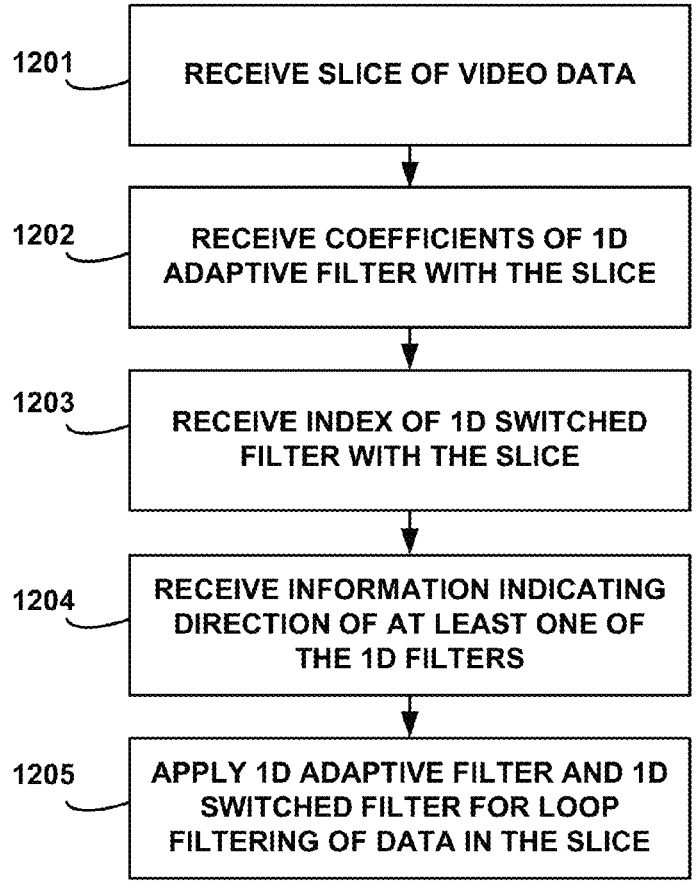

FIG. 12 is another flow diagram illustrating a process that may be performed by a video decoder consistent with this disclosure. FIG. 12 is very similar to FIG. 11, and will be described from the perspective of video decoder 60 of FIG. 3 although other devices may also perform the process. As shown in FIG. 12, entropy decoding unit 52 of video decoder receives a slice of video data (1201), receives coefficients of a 1D adaptive filter with the slice (1202), receives an index of a 1D switched filter with the slice (1203), and receives information indicating a direction of at least one of the 1D filters (1204). Given the direction of one of the 1D filters, decoder 60 may be able to imply the direction of the other 1D filter as being perpendicular to the first 1D filter. This information may be entropy decoded, e.g., from a slice header, and forwarded to filter unit 57. Based on this information, filter unit 57 applies the appropriate 1D adaptive filter using the received coefficients and the appropriate 1D switched filter for loop filtering of the reconstructed video data for the slice (1205).

Figure 13:
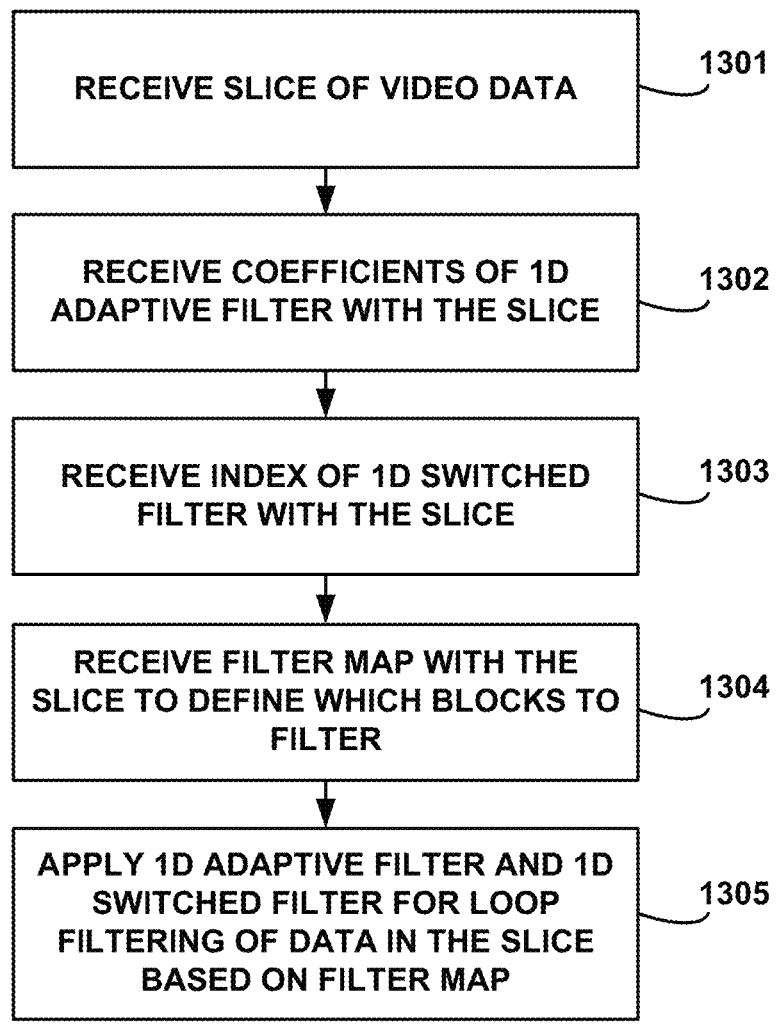

FIG. 13 is yet another flow diagram illustrating a process that may be performed by a video decoder consistent with this disclosure. FIG. 13 will be described from the perspective of video decoder 60 of FIG. 3 although other devices may also perform the process. As shown in FIG. 12, entropy decoding unit 52 of video decoder receives a slice of video data (1301), receives coefficients of a 1D adaptive filter with the slice (1302), receives an index of a 1D switched filter with the slice (1303), and receives a filter map with the slice to define which block of the slice to filter (1304). Filter unit 57 applies the appropriate 1D adaptive filter and 1D switched filter for loop filtering of specific blocks within the slice based on the filter map (1305).

The techniques of this disclosure may be realized in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units.

Accordingly, the techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable data storage medium may form part of a computer program product, which may include packaging materials.

The computer-readable medium may comprise a tangible computer readable storage medium, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

Various aspects of the disclosure have been described. These and other aspects are within the scope of the following claims.

The invention claimed is:

1. A method of loop filtering of reconstructed video data during a video coding process, the method comprising:
    applying a one-dimensional (1D) switched filter to the video data in a first direction that is either horizontal or vertical, wherein the 1D switched filter comprises two or more sets of switched filter coefficients, wherein an index signaled in a coded bitstream identifies a selected set of switched filter coefficients from the two or more sets of switched filter coefficients;
    when the 1D switched filter is applied in the horizontal direction, applying a 1D adaptive filter to the video data in the vertical direction; and
    when the 1D switched filter is applied in the vertical direction, applying a 1D adaptive filter to the video data in the horizontal direction,
    wherein the 1D adaptive filter applied comprises a set of adaptive filter coefficients, wherein the set of adaptive filter coefficients is signaled in the coded bitstream as adaptive filter coefficients or as deltas relative to previous or known adaptive filter coefficients.

2. The method of claim 1, wherein the method is applied at an encoder, the method further comprising:
    selecting the 1D switched filter from the two or more sets of switched filter coefficients;
    generating a syntax element that identifies the index; and
    identifying the set of adaptive filter coefficients for the 1D adaptive filter,
    wherein selecting the 1D switched filter, generating the syntax element, and identifying the set of adaptive filter coefficients for the 1D adaptive filter occurs at least once per slice for a sequence of encoded video data, wherein the slice corresponds to a set of largest coded units (LCUs) that define some or all of a video frame.

3. The method of claim 2, further comprising, at least once per slice:
    generating a syntax element that defines a direction associated with either the 1D switched filter or the 1D adaptive filter and orienting the other 1D filter in a direction perpendicular to the defined direction.

4. The method of claim 1, wherein the method is applied with respect to a first slice of a sequence of encoded video data, wherein a slice corresponds to a set of largest coded units (LCUs) that define some or all of a video frame, the method further comprising, for a second slice:
    applying a first 1D switched filter to the video data in the first direction that is either horizontal or vertical;
    when the 1D switched filter is applied in the horizontal direction, applying a second 1D switched filter to the video data in the vertical direction; and
    when the 1D switched filter is applied in the vertical direction, applying a second 1D switched filter to the video data in the horizontal direction.

5. The method of claim 1, wherein the method is performed with respect to a subset of coded units (CUs) of a slice, wherein the slice corresponds to a set of largest coded units (LCUs) that define some or all of a video frame.

6. The method of claim 5, wherein the method is performed by an encoder, the method further comprising:
    generating a filter map that defines the subset of coded units of the slice that are filtered.

7. The method of claim 5, wherein the method is performed by a decoder, the method further comprising:
    receiving a filter map that defines the subset of coded units of the slice that are filtered.

8. The method of claim 1, wherein the method is performed after deblock filtering of the reconstructed video data, wherein deblock filtering occurs with respect to boundaries of coded units (CUs) of a slice, wherein the slice corresponds to a set of largest coded units (LCUs) that define some or all of a video frame.

9. The method of claim 1, wherein the method is applied at a decoder, the method further comprising:
    receiving the index; and
    receiving information identifying the set of adaptive filter coefficients for the 1D adaptive filter,
    wherein receiving the index and receiving the information identifying the set of adaptive filter coefficients occurs at least once per slice for a sequence of encoded video data, wherein the slice corresponds to a set of largest coded units (LCUs) that define some or all of a video frame.

10. The method of claim 9, further comprising, at least once per slice:
    receiving information that identifies a direction associated with either the 1D switched filter or the 1D adaptive filter.

11. The method of claim 1, wherein the loop filtering comprises one of:
    post loop filtering, or
    in loop filtering.

12. The method of claim 1, the method further comprising:
    storing a first pre-defined set of filter coefficients in a pre-defined switched filter set, wherein the first pre-defined set of filter coefficients is accessible via a first index value; and
    storing a second pre-defined set of filter coefficients in the pre-defined switched filter set, wherein the second pre-defined set of filter coefficients is accessible via a second index value, wherein applying a one-dimensional (1D) switched filter to the video data in a first direction includes signaling the first index value.

13. The method of claim 1, the method being executable on a wireless communication device, wherein the device comprises:
a receiver configured to receive information over a channel;
a memory configured to store reconstructed and filtered video data; and
a processor,
wherein applying a 1D adaptive filter to the video data in the vertical direction includes executing instructions in the processor to apply the 1D filter to the video data in the vertical direction and wherein applying a 1D adaptive filter to the video data in the horizontal direction includes executing instructions in the processor to apply the 1D filter to the video data in the horizontal direction.

14. The method of claim 13, wherein the wireless communication device is a cellular radiotelephone and wherein the information received by the receiver is modulated according to a cellular communication standard.

15. A video coder apparatus that performs loop filtering of reconstructed video data during a video coding process, the video coder apparatus comprising:
a one-dimensional (1D) switched filter that filters the video data in a first direction that is either horizontal or vertical, wherein the 1D switched filter comprises two or more sets of switched filter coefficients, wherein an index signaled in a coded bitstream identifies a selected set of switched filter coefficients from the two or more sets of switched filter coefficients; and
a 1D adaptive filter that filters the video data in a vertical direction when the 1D switched filter filters the video data in the horizontal direction and that filters the video data in a horizontal direction when the 1D switched filter filters the video data in the vertical direction,
wherein the 1D adaptive filter comprises a set of adaptive filter coefficients, wherein the set of adaptive filter coefficients is signaled in the coded bitstream as adaptive filter coefficients or as deltas relative to previous or known adaptive filter coefficients.

16. The video coder apparatus of claim 15, wherein the video coder apparatus comprises an encoder that includes a filter unit, wherein the filter unit:
selects the 1D switched filter from the two or more sets of switched filter coefficients;
generates a syntax element that identifies the index; and
identifies the set of adaptive filter coefficients for the 1D adaptive filter,
wherein selecting the 1D switched filter, generating the syntax element, and identifying the set of adaptive filter coefficients for the 1D adaptive filter occurs at least once per slice for a sequence of encoded video data, wherein the slice corresponds to a set of largest coded units (LCUs) that define some or all of a video frame.

17. The video coder apparatus of claim 16, wherein at least once per slice the filter unit:
generates a syntax element that defines a direction associated with either the 1D switched filter or the 1D adaptive filter and orients the other 1D filter in a direction perpendicular to the defined direction.

18. The video coder apparatus of claim 15, wherein the 1D switched filter and the 1D adaptive filter are applied with respect to a first slice of a sequence of encoded video data, wherein a slice corresponds to a set of largest coded units (LCUs) that define some or all of a video frame, wherein for a second slice the video coder apparatus includes:
a first 1D switched filter that filters the video data in the first dimension that is either horizontal or vertical; and
a second 1D switched filter that filters the video data in a vertical direction when the first 1D switched filter filters the video data in the horizontal direction and that filters the video data in a horizontal direction when the first 1D switched filter filters the video data in the vertical direction.

19. The video coder apparatus of claim 15, wherein the 1D switched filter and the 1D adaptive filter are applied with respect to a subset of coded units (CUs) of a slice, wherein the slice corresponds to a set of largest coded units (LCUs) that define some or all of a video frame.

20. The video coder apparatus of claim 19, wherein the video coder apparatus comprises an encoder that includes a filter unit, wherein the filter unit:
generates a filter map that defines the subset of coded units of the slice that are filtered.

21. The video coder apparatus of claim 19, wherein the video coder apparatus comprises a decoder, wherein the decoder:
receives a filter map that defines the subset of coded units of the slice that are filtered.

22. The video coder apparatus of claim 15, wherein the 1D switched filter and the 1D adaptive filter are applied after deblock filtering of the reconstructed video data, wherein deblock filtering occurs with respect to boundaries of coded units (CUs) of a slice, wherein the slice corresponds to a set of largest coded units (LCUs) that define some or all of a video frame.

23. The video coder apparatus of claim 15, wherein the video coder apparatus comprises a decoder, wherein the decoder:
receives the index; and
receives information identifying the set of adaptive filter coefficients for the 1D adaptive filter,
wherein the decoder receives the index and the information identifying the set of adaptive filter coefficients at least once per slice for a sequence of encoded video data, wherein the slice corresponds to a set of largest coded units (LCUs) that define some or all of a video frame.

24. The video coder apparatus of claim 23, wherein at least once per slice, the decoder receives information that identifies a direction associated with either the 1D switched filter or the 1D adaptive filter.

25. The video coder apparatus of claim 15, wherein the loop filtering comprises one of:
post loop filtering, or
in loop filtering.

26. The video coder apparatus of claim 15, wherein the apparatus comprises at least one of:
an integrated circuit;
a microprocessor,
a wireless communication device that includes a video encoder, or
a wireless communication device that includes a video decoder.

27. The video coder apparatus of claim 15, wherein the two or more sets of switched filter coefficients include a first and a second pre-defined set of filter coefficients, wherein the first pre-defined set of filter coefficients is accessible via a first index value and wherein the second pre-defined set of filter coefficients is accessible via a second index value.

28. The video coder apparatus of claim 15, wherein the video coder apparatus is a wireless communication device, wherein the apparatus further comprises:
  a receiver configured to receive information over a wireless channel;
  a memory; and
  a processor configured to filter the video data and to transfer the filtered video data to the memory, wherein the 1D switched filter and the 1D adaptive filter are implemented as instructions executing on the processor.

29. The video coder apparatus of claim 28, wherein the wireless communication device is a cellular radiotelephone and wherein the information is modulated according to a cellular communication standard.

30. A device that performs loop filtering of reconstructed video data during a video coding process, the device comprising:
  means for applying a one-dimensional (1D) switched filter to the video data in a first direction that is either horizontal or vertical, wherein the 1D switched filter comprises two or more sets of switched filter coefficients, wherein an index signaled in a coded bitstream identifies a selected set of switched filter coefficients from the two or more sets of switched filter coefficients; and
  means for applying a 1D adaptive filter to the video data in the vertical direction when the 1D switched filter is applied in the horizontal direction and for applying the 1D adaptive filter to the video data in the horizontal direction when the 1D switched filter is applied in the vertical direction, wherein the 1D adaptive filter comprises a set of adaptive filter coefficients, wherein the set of adaptive filter coefficients is signaled in the coded bitstream as adaptive filter coefficients or as deltas relative to previous or known adaptive filter coefficients.

31. The device of claim 30, wherein the device comprises an encoder, the device further comprising:
  means for selecting the 1D switched filter from the two or more sets of switched filter coefficients;
  means for generating a syntax element that identifies the index; and
  means for identifying the set of adaptive filter coefficients for the 1D adaptive filter,
  wherein the means for selecting, the means for generating, and the means for identifying the set of adaptive filter coefficients for the 1D adaptive filter perform the selecting, generating and identifying at least once per slice for a sequence of encoded video data, wherein the slice corresponds to a set of largest coded units (LCUs) that define some or all of a video frame.

32. The device of claim 31, further comprising, at least once per slice:
  means for generating a syntax element that defines a direction associated with either the 1D switched filter or the 1D adaptive filter; and
  means for orienting the other 1D filter in a direction perpendicular to the defined direction.

33. The device of claim 30, wherein the device operates with respect to a first slice of a sequence of encoded video data, wherein a slice corresponds to a set of largest coded units (LCUs) that define some or all of a video frame, the device further comprising, for a second slice:
  means for applying a first 1D switched filter to the video data in the first dimension that is either horizontal or vertical; and
  means for applying a second 1D switched filter in the the vertical direction when the first 1D switched filter is applied in the horizontal direction and for applying the second 1D switched filter to the video data in the horizontal direction when the first 1D switched filter is applied in the vertical direction.

34. The device of claim 30, wherein the device operates with respect to a subset of coded units (CUs) of a slice, wherein the slice corresponds to a set of largest coded units (LCUs) that define some or all of a video frame.

35. The device of claim 34, wherein the device comprises an encoder, the device further comprising:
  means for generating a filter map that defines the subset of coded units of the slice that are filtered.

36. The device of claim 34, wherein the device comprises a decoder, the device further comprising:
  means for receiving a filter map that defines the subset of coded units of the slice that are filtered.

37. The device of claim 30, the device further comprising means for deblock filtering of the reconstructed video data, wherein the means for applying the 1D switched filter and the means for applying a 1D adaptive filter operates after the means for deblock filtering, wherein the means for deblock filtering operates with respect to boundaries of coded units (CUs) of a slice, wherein the slice corresponds to a set of largest coded units (LCUs) that define some or all of a video frame.

38. The device of claim 30, wherein the device comprises a decoder, the device further comprising:
  means for receiving the index; and
  means for receiving information identifying the set of adaptive filter coefficients for the 1D adaptive filter,
  wherein the means for receiving the index and the means for receiving the information identifying the set of adaptive filter coefficients receive the index and the information identifying the set of adaptive filter coefficients at least once per slice for a sequence of encoded video data, wherein the slice corresponds to a set of largest coded units (LCUs) that define some or all of a video frame.

39. The device of claim 38, further comprising, at least once per slice:
  means for receiving information that identifies a direction associated with either the 1D switched filter or the 1D adaptive filter.

40. The device of claim 30, wherein the loop filtering comprises one of:
  post loop filtering, or
  in loop filtering.

41. The device of claim 30, further comprising:
  means for storing a first pre-defined set of filter coefficients in a pre-defined switched filter set, wherein the first pre-defined set of filter coefficients is accessible via a first index value; and
  means for storing a second pre-defined set of filter coefficients in the pre-defined switched filter set, wherein the second pre-defined set of filter coefficients is accessible via a second index value,
  wherein means for applying a one-dimensional (1D) switched filter to the video data in a first direction includes means for signaling the first index value.

42. A non-transitory computer-readable storage medium comprising instructions that upon execution in a processor cause the processor to perform loop filtering of reconstructed video data during a video coding process, wherein the instructions upon execution cause the processor to:

apply a one-dimensional (1D) switched filter to the video data in a first direction that is either horizontal or vertical, wherein the 1D switched filter comprises two or more sets of switched filter coefficients, wherein an index signaled in a coded bitstream identifies a selected set of switched filter coefficients from the two or more sets of switched filter coefficients;

apply a 1D adaptive filter to the video data in the vertical direction when the 1D switched filter is applied in the horizontal direction; and apply a 1D adaptive filter to the video data in the horizontal direction when the 1D switched filter is applied in the vertical direction, wherein the 1D adaptive filter applied comprises a set of adaptive filter coefficients, wherein the set of adaptive filter coefficients is signaled in the coded bitstream as adaptive filter coefficients or as deltas relative to previous or known adaptive filter coefficients.

43. The non-transitory computer-readable storage medium of claim 42, wherein the processor comprises an encoder, wherein the instructions cause the processor to:
select the 1D switched filter from the two or more sets of switched filter coefficients;
generate a syntax element that identifies the index; and
identify the set of adaptive filter coefficients for the 1D adaptive filter,
wherein selecting the 1D switched filter, generating the syntax element, and identifying the set of adaptive filter coefficients for the 1D adaptive filter occurs at least once per slice for a sequence of encoded video data, wherein the slice corresponds to a set of largest coded units (LCUs) that define some or all of a video frame.

44. The non-transitory computer-readable storage medium of claim 43, further comprising instructions that cause the processor to, at least once per slice:
generate a syntax element that defines a direction associated with either the 1D switched filter or the 1D adaptive filter; and
orient the other 1D filter in a direction perpendicular to the defined direction.

45. The non-transitory computer-readable storage medium of claim 42, wherein applying the 1D switched filter and applying the 1D adaptive filter occurs with respect to a first slice of a sequence of encoded video data, wherein a slice corresponds to a set of largest coded units (LCUs) that define some or all of a video frame, the computer-readable storage medium further comprising instructions that cause the processor to, for a second slice:
apply a first 1D switched filter to the video data in the first direction that is either horizontal or vertical;
apply a second 1D switched filter to the video data in the vertical direction when the first 1D switched filter is applied in the horizontal direction; and
apply the second 1D switched filter to the video data in the horizontal direction when the first 1D switched filter is applied in the vertical direction.

46. The non-transitory computer-readable storage medium of claim 42, wherein applying the 1D switched filter and applying the 1D adaptive filter occurs with respect to a subset of coded units (CUs) of a slice, wherein the slice corresponds to a set of largest coded units (LCUs) that define some or all of a video frame.

47. The non-transitory computer-readable storage medium of claim 46, wherein the processor comprises an encoder, the computer-readable storage medium further comprising instructions that cause the processor to:
generate a filter map that defines the subset of coded units of the slice that are filtered.

48. The non-transitory computer-readable storage medium of claim 46, wherein the processor comprises a decoder, the computer-readable storage medium further comprising instructions that cause the processor to:
receive a filter map that defines the subset of coded units of the slice that are filtered.

49. The non-transitory computer-readable storage medium of claim 42, further comprising instructions that cause the processor to perform deblock filtering of the reconstructed video data, wherein applying the 1D switched filter and applying the 1D adaptive filter occurs after the deblock filtering, wherein the deblock filtering occurs with respect to boundaries of coded units (CUs) of a slice, wherein the slice corresponds to a set of largest coded units (LCUs) that define some or all of a video frame.

50. The non-transitory computer-readable storage medium of claim 42, wherein the processor comprises a decoder, the computer-readable storage medium further comprising instructions that cause the processor to:
receive the index of the 1D switched filter; and
receive information identifying the set of adaptive filter coefficients for the 1D adaptive filter,
wherein receiving the index and the information identifying the set of adaptive filter coefficients occurs at least once per slice for a sequence of encoded video data, wherein the slice corresponds to a set of largest coded units (LCUs) that define some or all of a video frame.

51. The non-transitory computer-readable storage medium of claim 50, further comprising instructions that cause the processor to, at least once per slice:
receive information that identifies a direction associated with either the 1D switched filter or the 1D adaptive filter; and
orient the other 1D filter in a direction perpendicular to the identified direction.

52. The non-transitory computer-readable storage medium of claim 42, wherein the loop filtering comprises one of:
post loop filtering, or
in loop filtering.

53. The non-transitory computer-readable storage medium of claim 42, wherein the processor comprises an encoder, wherein the instructions cause the processor to:
store a first pre-defined set of filter coefficients in a pre-defined switched filter set, wherein the first pre-defined set of filter coefficients is accessible via a first index value; and
store a second pre-defined set of filter coefficients in the pre-defined switched filter set, wherein the second pre-defined set of filter coefficients is accessible via a second index value,
wherein applying a one-dimensional (1D) switched filter to the video data in a first direction includes signaling the first index value.

* * * * *